(12) United States Patent
Kim et al.

(10) Patent No.: US 9,311,167 B2
(45) Date of Patent: Apr. 12, 2016

(54) APP OPERATING METHOD AND DEVICE AND APP OUTPUT DEVICE SUPPORTING THE SAME

(71) Applicant: Samsung Electronics Co., Ltd., Suwon-si, Gyeonggi-do (KR)

(72) Inventors: Junghun Kim, Suwon-si (KR); Yongjoon Jeon, Hwaseong-si (KR); Suhyung Ha, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 6 days.

(21) Appl. No.: 14/228,919

(22) Filed: Mar. 28, 2014

(65) Prior Publication Data

US 2014/0298355 A1    Oct. 2, 2014

(30) Foreign Application Priority Data

Apr. 1, 2013    (KR) .......................... 10-2013-0035173

(51) Int. Cl.
*G06F 3/00* (2006.01)
*G06F 9/54* (2006.01)
*G06F 9/44* (2006.01)

(52) U.S. Cl.
CPC ................ *G06F 9/54* (2013.01); *G06F 9/4445* (2013.01)

(58) Field of Classification Search
CPC .............................. G06F 3/0481; G06F 3/1423
USPC ............................................ 345/1.1; 715/748
See application file for complete search history.

(56) References Cited

U.S. PATENT DOCUMENTS

| 8,881,170 | B2* | 11/2014 | Beilis et al. .................. 719/310 |
| 2009/0307679 | A1 | 12/2009 | Lee et al. |
| 2011/0125610 | A1* | 5/2011 | Goodsall et al. ............. 705/27.1 |
| 2013/0227419 | A1* | 8/2013 | Lee et al. ...................... 715/728 |
| 2013/0278484 | A1* | 10/2013 | Hwang et al. ................. 345/2.3 |

OTHER PUBLICATIONS

Richardson et al., "Virtual Network Computing", IEEE Internet Computing, Jan. 1, 1988, pp. 33-38, vol. 2, No. 1, New York, NY—Institute of Electrical and Electronics Engineers.

* cited by examiner

*Primary Examiner* — Andy Ho
(74) *Attorney, Agent, or Firm* — Jefferson IP Law, LLP.

(57) ABSTRACT

An Application (APP) operating method, an APP operating device, and an APP output device for supporting the APP operating method are provided. The APP operating method includes connecting an APP operating device and an APP output device, transmitting, by the APP operating device, APP data corresponding to a plurality of APPs being executed in the APP operating device to the APP output device, and outputting, by the APP output device, a plurality of APP areas respectively corresponding to the APP data.

20 Claims, 23 Drawing Sheets

APP OPERATING METHOD AND DEVICE AND APP OUTPUT DEVICE SUPPORTING THE SAME

CROSS-REFERENCE TO RELATED APPLICATION(S)

This application claims the benefit under 35 U.S.C. §119 (a) of Korean patent application filed on Apr. 1, 2013 in the Korean Intellectual Property Office and assigned Serial number 10-2013-0035173, the entire disclosure of which is hereby incorporated by reference.

TECHNICAL FIELD

The present disclosure relates to operation of an electronic device. More particularly, the present disclosure relates to Application (APP) operation of an electronic device.

BACKGROUND

In recent years, electronic devices have supported complex operations of various user functions based on the development of hardware technologies. Electronic devices according to the related art support a multi-tasking function. However, although supporting activation of a plurality of user functions, the multi-tasking function operated in the electronic devices supports only operation of a specific user function according to a user input control.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an Application (APP) operating method and an APP operating device for providing more improved APP operation functions and an APP output device for supporting the same.

In accordance with an aspect of the present disclosure, a method of operating an APP is provided. The method includes connecting an APP operating device and an APP output device, transmitting APP data corresponding to a plurality of APPs being activated in the APP operating device to the APP output device, by the APP operating device, and outputting a plurality of APP areas corresponding to the APP data, by the APP output device.

In accordance with another aspect of the present disclosure, a device for operating an APP is provided. The device includes a storage unit that stores a plurality of APPs, a controller that provides any one of the plurality of APPs in an execution status and maintains remaining APPs in background processing, and a connection interface that provides a communication channel for transmitting APP data corresponding to the plurality of APPs to an APP output device.

In accordance with another aspect of the present disclosure, a device for outputting an APP is provided. The device includes a device connector that receives APP data corresponding to a plurality of APPs in an activation status in an APP operating device, a device controller that generates APP areas corresponding to the APP data, and a device display unit that displays the APP areas.

In accordance with another aspect of the present disclosure, a method of operating an APP on an APP operating device is provided. The method includes establishing a connection with an APP output device, executing a plurality of APPs, and transmitting APP data corresponding to a plurality of APPs being executed in the APP operating device to the APP output device.

In accordance with another aspect of the present disclosure, a method of an AP output device for operating an APP is provided. The method includes establishing a connection with an APP operating device, receiving APP data corresponding to a plurality of APPs being executed in the APP operating device, and outputting a plurality of APP areas respectively corresponding to the APP data.

As described above, the present disclosure provides the APP operating method and device and the APP output device supporting the same, which can provide more improved user operation efficiency related to APP operation.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
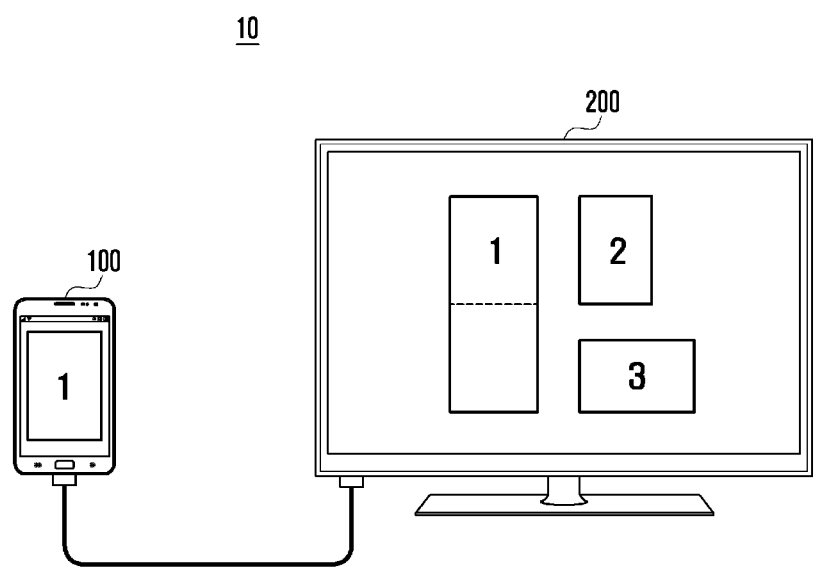
FIG. 1 illustrates a schematic configuration of an Application (APP) operating system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some configuration elements may be exaggerated, omitted, or schematically shown, and a size of each element may not precisely reflect the actual size. Accordingly, various embodiments of the present disclosure are not restricted by a relative size or interval shown in the accompanying drawings.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 illustrates a schematic configuration of an Application (APP) operating system supporting an application operation according to an embodiment of the present disclosure.

Referring to FIG. 1, an APP operating system 10 of the present disclosure may include an APP operating device 100 and an APP output device 200.

The APP operating system 10 having the above-mentioned configuration may output APP data of at least one APP executed in the APP operating device 100 through the APP output device 200. According to various embodiments of the present disclosure, during the process of outputting APP data of at least one APP executed in the APP operating device 100 through the APP output device 200, the APP output device 200 may output APP data of at least some of APPs being executed in the APP operating device 100.

For example, assuming that five APPs are being operated in the APP operating device 100, APP data for at least one of the five APPs may be output through the APP output device 200. The APP operating device 100 may output at least one running APP on the top layer while operating the five APPs and may support operation of the corresponding APPs in an execution status according to a user input. The APP operating device 100 may maintain at least one APP in an activation status through background processing.

According to various embodiments of the present disclosure, the execution status may include at least one of a status in which the APP can be controlled according to an input signal in the APP operating device 100 and a status in which the APP is output on the top layer. The activation status may be a status in which the APP is not output on the top layer of a screen, or the APP is not operated according to an input signal although having been loaded in a memory. Among the APPs in the activation status, the APP having a widget function may be changed from the activation status to an execution status according to setting information. According to various embodiments of the present disclosure, the APPs in the activation status may be changed to the execution status by a user designation. Hereinafter, a memory may be an area in which information is recorded by a controller 160 or data stored in a storage unit 150 is loaded. For example, the memory may be a Random Access Memory (RAM) area, and/or the like. Such a memory may serve as a buffer in some cases.

The APP operating device 100 corresponds to a device that stores at least one APP in the storage unit 150, activates the corresponding APP according to a user request, and thereafter provides an execution status selectively or in response to the user request. The APP operating device 100 may transmit, to the APP output device 200, APP data for at least one APP during the execution status and the activation status according to a connection of the APP output device 200 or a user control after the connection of the APP operating device 100 to the APP output device 200. If the APP data is updated by operation of the corresponding APP, then the APP operating device 100 may transmit the updated APP data to the APP output device 200.

The APP operating device 100 may control operation of a specific APP according to at least one of an input signal from the APP output device 200 and an input signal from an input unit included in the APP operating device 100. During this process, when the updated APP data is generated, the APP operating device 100 may transmit the corresponding APP data to the APP output device 200. According to various embodiments of the present disclosure, the APP data may include at least one of image data and text data which can be output on a device display unit of the APP output device 200. Various configurations of the APP operating device 100 for supporting an APP operating function according to various embodiments of the present disclosure will be described below more specifically with reference to FIGS. 2 and 3.

The APP output device 200 may be connected to the APP operating device 100 through at least one of wired and wireless connection. The APP output device 200 may receive APP data associated with at least one APP provided by the APP operating device 100 and may output the received APP data to the device display unit. According to various embodiments of the present disclosure, during the process of the APP output device 200 receiving APP data associated with at least one APP provided by the APP operating device 100 and outputting the APP data to the device display unit, in a case in which the APP operating device 100 provides a plurality of APP data, the APP output device 200 may classify the APP data and control such that the APP data is output to the device display unit as an APP area. According to various embodiments of the present disclosure, the APP output device 200 may include the device display unit having a larger display area than that of the APP operating device 100. The APP output device 200 may output the plurality of APP areas in the corresponding display area without the APP areas overlapping each other. Alternatively, even if the APP areas partially overlap each other, the APP output device 200 may provide a proper display space such that a user may easily operate the respective APPs.

Further, the APP output device 200 may display an APP area larger than that displayed in the APP operating device 100 for a specific APP. According to various embodiments of the present disclosure, the APP output device 200 does not simply expand the APP area of the APP operating device 100. According to various embodiments of the present disclosure, the APP output device 200 may provide an expanded area containing more data. For example, if the APP operating device 100 has output a list containing ten items, the APP output device 200 may output a list containing twenty items. During this process, the APP output device 200 may also provide, for the twenty items, areas equal to or larger than those assigned to the respective items in the APP operating device 100.

Meanwhile, the APP output device 200 may include a device input unit. The APP output device 200 may transmit an input signal for a control of an APP operation, which is input through the device input unit, to the APP operating device 100. When receiving APP data updated by the transmitted input signal, the APP output device 200 may update displaying of an APP area related to the corresponding updated APP data. Configurations of the above-described APP output device 200 and functions thereof will be described below more specifically with reference to FIGS. 4 and 5.

According to various embodiments of the present disclosure, while providing the above-described functions, the APP operating system 10 may perform more diverse control for the APPs operated in the APP operating device 100 through the APP output device 200. Further, the APP operating system 10 transmits a user control using the APP output device 200 to the APP operating device 100 and allows the user control to be performed for the corresponding APP. Accordingly, even in the APP output device 200, the user may freely operate at least one APP installed in the APP operating device 100. Meanwhile, the APPs in the above description are various APPs provided by the APP operating device 100 and may include various APPs such as an APP in an activation or execution status according to a user selection and an APP activated at a specific time point according to a user setting. For example, the above-described APPs may include at least one of a dial input APP for a telephone call, an audio file or video file reproducing APP, a file editing APP, a broadcast receiving APP, a gallery APP, a chatting APP, an alarm APP, a calculator APP, a phonebook APP, a schedule APP, a calendar APP, and/or the like.

Figure 2:
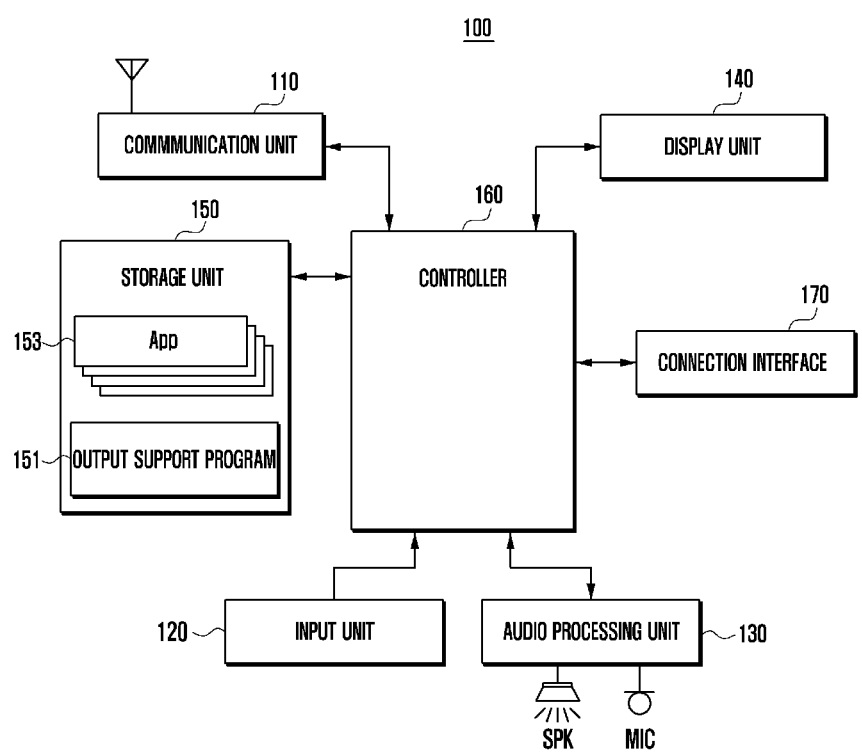
FIG. 2 is a block diagram illustrating an APP operating device according to an embodiment of the present disclosure.

FIG. 2 is a block diagram illustrating an APP operating device according to an embodiment of the present disclosure.

Referring to FIG. 2, the APP operating device 100 may include a communication unit 110, an input unit 120, an audio processing unit 130, a display unit 140, a storage unit 150, and a controller 160. According to various embodiments of the present disclosure, the APP operating device 100 may further include a connection interface 170. In addition, the APP operating device 100 may also further include an image sensor for image collection according to a design method. Moreover, the APP operating device 100 may also further include various sensors as an input device such as an acceleration sensor or a proximity sensor, a motion sensor such as a gyro sensor, an illumination sensor, and/or the like.

Meanwhile, the connection interface 170 corresponds to an interface to which at least one APP output device 200 can be connected. For example, a smart TV, a smart monitor or another electronic device (e.g., terminal) may be connected to the connection interface 170 of the APP output device 200. The APP output device 200, which will be described below, may include various input units such as a keyboard, a mouse, an electronic pen, a remote controller, and/or the like as a device input unit. Accordingly, the connection interface 170 may not only output APP data related to at least one APP to the APP output device 200 but may also transfer an input signal generated by the APP output device 200 to the controller 160. In this case, the connection interface 170 may perform both an output function of outputting APP data of the APP operating device 100 to the APP output device, and an input function of transferring a user input signal collected by the APP output device to the controller 160.

The communication unit 110 supports a communication function of the APP operating device 100. The communication unit 110 supports formation of at least one communication channel for supporting APPs requiring communication among the above-described various APPs as well as a message service function, a webpage search function, a video call function, a voice call function, a data transmission/reception function, a cloud function, and/or the like of the APP operating device 100. The communication unit 110 may include a mobile communication module in a case in which the APP operating device 100 supports a mobile communication function. Further, the communication unit 110 may include a broadcast receiving module in a case in which the APP operating device 100 supports a broadcast receiving function. If the communication unit 110 forms a specific communication channel and receives data through the corresponding communication channel, then the received data may be provided to the controller 160. The controller 160 may provide the corresponding data to the corresponding APP to support an APP operation. According to various embodiments of the present disclosure, APP data provided for the corresponding APP operation may also be provided to the APP output device 200.

The input unit 120 generates various input signals required for operation of the APP operating device 100. The input unit 120 may be formed in the shape of a specific key such as a button key, a side key, a home key, and/or the like. While one APP is in an activation status, the input unit 120 is operated as a configuration for generating an input signal for operation of the corresponding APP. If an input signal generated by a push of the input unit 120 is transferred to the controller 160, then the controller 160 may provide the corresponding input signal to a running APP.

Meanwhile, in a case in which the display unit 140 is provided in the form of a touch screen supporting a touch function, the input unit 120 may include the display unit 140. A touch event generated through the display unit 140 is transferred to the controller 160, and the controller 160 may apply the touch event to a running APP. If an APP operation is updated by an input signal generated through the input unit 120, then the controller 160 may transfer APP data updated according to the update of the APP operation to the APP output device 200.

The audio processing unit 130 processes various audio signals generated in a process of operating the APP operating device 100. For example, the audio processing unit 130 may include a Speaker (SPK) to support an output of an audio signal generated or decoded in the APP operating device 100, and in addition or in the alternative, may include a Microphone (MIC) configured to collect audio signals so as to support a voice or video call function and a recording function.

Meanwhile, if the APP output device 200 is connected to the connection interface 170, then the audio processing unit 130 may output a guide sound or sound effect corresponding to (or otherwise indicating) the connection. If specific APP data is transmitted to the APP output device 200, the audio processing unit 130 may output a guide sound or effect sound corresponding to the transmission. The above-described function of outputting the guide sound may be omitted or otherwise configured according to a manufacturer design and/or a user selection or preferences.

The display unit 140 outputs various functional screens required during operation of the APP operating device 100. For example, the display unit 140 may display a menu screen, a screen for operating a specific APP, a screen for operating a plurality of APPs, a full screen of a specific APP during operation of a plurality of APPs, and/or the like. According to various embodiments of the present disclosure, the display unit 140 may output an APP operation screen activated according to a userselection. The APP operation screen may be output in a landscape mode or portrait mode on the display unit 140 according to a setting of a user or a setting of the corresponding APP. The APP operation screen output on the display unit 140 may output information updated by an input signal input from the input unit 120 or the device input unit. The updated information as updated APP data may be transferred to the APP output device 200. The various screen interfaces as described above will be described below more specifically with reference to the accompanying drawings.

Meanwhile, the above-described display unit 140 may include a touch panel and a display panel for support of an input function. Further, the display unit 140 may include a pen touch panel for operation of an electronic pen. The touch panel may be a panel, such as a capacitive touch panel, a resistive touch panel, and/or the like capable of detecting a physical or electronical change by a userfinger touch. The touch panel is disposed on a front or rear surface of the display panel and provides, to the controller 160, position information by a user finger touch and gesture information according to a user finger movement. The display panel is an area in which screen elements are output. The display panel is mapped with the touch panel and outputs various screen elements. For example, the display panel may output an operation screen of a specific APP among a plurality of APPs being operated. The pen touch panel is disposed on a front or rear surface of the display panel, recognizes an electronic pen according to proximity of the electronic pen, and provides information according to a movement of the electronic pen to the controller 160. The touch pen panel may be provided in various forms according to characteristics of the electronic pen. For example, the pen touch panel may be formed of an electromagnetic induction type panel. The touch panel and the pen touch panel as described above may be used as the input unit 120 of the APP operating device 100. Meanwhile, in a case in which the APP operating device 100 is designed such that at least one of a finger touch function and a pen touch function is not included, the display unit 140 may be implemented as a configuration in which at least one of the touch panel and the pen touch panel is not included.

The storage unit 150 may store various application programs required for operation of the APP operating device 100 and various APP data generated during the operation of the APP operating device 100. For example, the storage unit 150 may store programs including an operating system required for the operation of the APP operating device 100. More particularly, the storage unit 150 stores various APPs related to user functions, and provides the APPs to the controller 160 in response to a userrequest such that a function of the corresponding APP may be operated. According to various embodiments of the present disclosure, the storage unit 150 may include a plurality of APPs 153 and may include an output support program 151 as illustrated. Further, the storage unit 150 may include at least one buffer storing APP data generated according to operation of the APPs 153. Meanwhile, in a case in which a predetermined area of the storage unit 150 is not provided as a buffer, a separate buffer may be disposed in the controller 160.

According to various embodiments of the present disclosure, the plurality of APPs 153 are application programs for supporting various functions installed in the APP operating device 100. The plurality of APPs 153 may be provided in the form of an icon or a separate menu item to the display unit 140, or may be activated according to a userrequest or schedule information while being allocated to hot keys. For example, the plurality of APPs 153 includes the afore-mentioned various APPs including a voice call APP, a video call APP, a cloud APP, a camera APP, a web connection APP, a game APP, and/or the like. Further, the plurality of APPs 153 may also include a plurality of APPs for similar functions. For example, the plurality of APPs 153 may include a plurality of browser APPs. Further, the plurality of APPs 153 may include a plurality of APPs regarding the camera 170. In addition, the plurality of APPs 153 may include a plurality of APPs for utilization of the APP output device 200. Accordingly, in a case in which the plurality of APPs are activated, the APP operating device 100 may support operation and processing for each of the APPs. More particularly, the APP operating device 100 may apply an input signal to a specific APP and may transfer APP data updated according to the input signal to the APP output device 200.

According to various embodiments of the present disclosure, the output support program 151 is a program for allowing APP data corresponding to at least one APP operated in the APP operating device 100 to be output through the APP output device 200. The output support program 151 may include a routine for loading at least one APP having received a request for activation in a memory, for example, a RAM, a routine for executing a designated specific APP among the loaded APPs, loading an operation screen of the executed APP in a frame memory or a frame buffer, and outputting the operation screen of the executed APP to the display unit 140, and/or the like. The frame memory or the frame buffer is a storage area allocated to the display unit 140 and may be differentiated from a memory provided for the storage unit 150 and the controller 160.

According to various embodiments of the present disclosure, the output support program 151 may include a routine for determining a connection of the APP output device 200, a routine for transmitting APP data of at least some of APPs activated according to a setting or automatically to the connected APP output device 200, and/or the like. The output support program 151 may include a routine for receiving an input signal for operating a specific APP from the APP output device 200, a routine for applying the received input signal to the operation of the corresponding APP, a routine for transmitting APP data updated according to the applying of the input signal to the APP output device 200, and/or the like.

According to various embodiments of the present disclosure, the output support program 151 may include a routine for receiving an input signal from the input unit 120 or the display unit 140 having an input function, a routine for applying the received input signal to an APP displayed on the top layer or a specific running APP among the APPs, a routine for updating an operation screen of the corresponding APP, a routine for outputting the updated APP data to the APP output device 200, and/or the like. The output support program 151 may include a routine for receiving an input signal generated according to a setting, a routine for determining an APP to which the corresponding input signal will be applied, a routine for applying the corresponding input signal to the corresponding APP, a routine for transmitting APP data updated according to the applying of the input signal to the APP output device 200, and/or the like. The output support program 151 may include a routine for applying an input signal generated by the APP operating device 100 to a running APP in the APP operating device 100, a routine for applying an input signal received from the APP output device 200 to an APP outputting APP data to the APP output device 200, a routine for transmitting the corresponding APP data to which the input signal of the APP output device 200 has been applied to the APP output device 200 independently of the APP operation of the APP operating device 100, and/or the like.

According to various embodiments of the present disclosure, the output support program 151 may include a routine for providing APP data to each of a plurality of APP output devices 200 or a routine for distributing the APP data to the plurality of APP output devices 200, a routine for providing APP data according to a landscape or portrait mode for each of APPs to the APP output device 200, a routine for providing, to the APP output device 200, APP data for which a display mode of the corresponding APP is changed according to a signal, received from the APP output device 20, for requesting a change of a landscape or portrait mode, and/or the like. The output support program 151 may include a routine for adjusting an APP area, which will be displayed according to an APP operation, in response to a request of the APP output device 200, a routine for adjusting a display buffer of the corresponding APP according to the change of the APP area, a routine for adjusting data allocation according to the adjustment of the display buffer, and/or the like.

The connection interface 170 is a configuration for a connection with an APP output device which can be connected to the APP operating device 100. The connection interface 170 may support both a wired manner and a wireless manner. Accordingly, the connection interface 170 may include a wired serial connection interface such as a Universal Serial Bus (USB) interface, a Univeral Asynchronous Receiver/Transmitter (UART) interface, and/or the like. Further, the connection interface 170 may include a wireless connection interface such as, for example, a Bluetooth connection interface, a Zigbee connection interface, a Ultra WideBand (UWB) connection interface, a Radio Frequency IDentification (RFID) connection interface, an infrared ray connection interface, a Wireless Application Protocol (WAP) connection interface, a Near Field Communication (NFC) connection interface, and/or the like. Namely, the connection interface 170 may include various types of communication connection interfaces that can be connected with the APP operating device 100. The connection interface 170 may include a plurality of ports and a plurality of wireless communication modules for a connection with a plurality of APP output devices as well as a single APP output device 200.

The controller 160 supports processing of various signals and data related to operation of the APP operating device 100. Namely, if the controller 160 receives a request for activation of a specific APP, then the controller 160 performs operation of the specific APP and supports an output of an APP operation screen on the display unit 140. According to various embodiments of the present disclosure, during the process of the controller 160 performing an operation of the specific APP and supporting an output of the APP operation screen on the display unit 140, according to setting information or a userrequest, the controller 160 may support an adjustment of a size, the number, a display direction, an update of an APP area to be displayed, and/or the like according to the operation of the specific APP and may support a control of the corresponding APP according to an input signal. According to various embodiments of the present disclosure, the controller 160 may include configurations as illustrated in FIG. 3.

Figure 3:
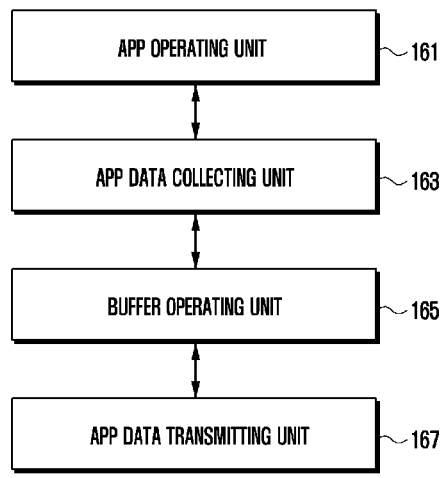
FIG. 3 is a block diagram illustrating a controller of an APP operating device according to the embodiment of the present disclosure.

FIG. 3 is a block diagram illustrating a controller of an APP operating device according to an embodiment of the present disclosure.

Referring to FIG. 3, the controller 160 of the APP operating device may include an APP operating unit 161, an APP data collecting unit 163, a buffer operating unit 165, and an APP data transmitting unit 167.

According to various embodiments of the present disclosure, the APP operating unit 161 may support operation of a specific APP selected by an event generated from at least one of the input unit 120 and the display unit 140 supporting the input function or operation of an APP set to be executed by an event generated according to setting information. More particularly, the APP operating unit 161 may support activation of a plurality of APPs according to the event generation. The APP operating unit 161 may support execution of a specific APP among the plurality of APPs according to a userselection or setting. According to various embodiments of the present disclosure, the APP operating unit 161 may support an output of any one of APP data generated according to the APP operation on the full screen of the display unit 140. The APP operating unit 161 may process the remaining APP data in a background. For example, the APP operating unit 161 may control APP data related to APPs in an activation status to be loaded in a memory or a buffer but not output to the display unit 140. The APP operating unit 161 may support an output of only APP data of an APP having received an execution request among the APPs in the activation status to the display unit 140.

According to various embodiments of the present disclosure, the APP operating unit 161 may switch a specific APP from an activation status to an execution status by setting information, and may control APP operation according to the corresponding information. According to various embodiments of the present disclosure, the APP operating unit 161 may not execute the specific APP in the activation status, and may provide, through an interrupt signal form, that an event related to the corresponding APP has been generated.

Meanwhile, if the APP operating unit 161 receives a request for execution of a specific APP from the input device including at least one of the input unit 120 and the display unit 140 supporting the input function, the APP operating unit 161 may support the execution of the corresponding APP. According to various embodiments of the present disclosure, if the APP is in an inactivation status, then the APP operating unit 161 may load the APP in a memory and execute the APP. If the APP is in an activation status, the APP operating unit 161 may switch the APP from the activation status to an execution status and may support an output of APP data according to the operation of the corresponding APP on the display unit 140.

Further, if the APP operating unit 161 receives an input signal for operating the specific APP from the input device or the APP output device 200, then the APP operating unit 161 may control application of the corresponding input signal to the corresponding APP. According to various embodiments of the present disclosure, the APP operating unit 161 may control application of the input signal generated by the input device of the APP operating device 100 to the APP running as a default. The APP operating unit 161 may control the input signal received from the APP output device 200 to be applied to an APP designated by the corresponding input signal. According to various embodiments of the present disclosure, the APP operating unit 161 may control the input signal received from the APP output device 200 to be processed through background processing. Further, the APP operating unit 161 may change a status of the APP designated by the input signal received from the APP output device 200 to an execution status, output the corresponding APP data to the display unit 140, and support application of the input signal.

According to various embodiments of the present disclosure, if the APP operating unit 161 receives an event for a landscape or portrait mode of the APP operating device 100, then the APP operating unit 161 may apply the event to an execution screen. According to various embodiments of the present disclosure, if a landscape mode or portrait mode is designated as a default mode for a specific APP, then the APP operating unit 161 may support maintenance of the corresponding landscape mode or portrait mode irrespective of a horizontal or vertical status (e.g., the orientation) of the APP operating device 100. Further, while a specific APP is being operated in a landscape or portrait mode, if another APP enters an execution status and the running APP is changed to an activation status, the APP operating unit 161 may maintain the landscape or portrait mode shortly before the operation of the corresponding APP.

Accordingly, APP data of the specific APP may be stored in a memory while being maintained in the status in which the specific APP has been executed, for example, in the landscape or portrait mode. Meanwhile, the APP operating unit 161 may change a screen of the specific APP from a landscape mode to a portrait mode or from a portrait mode to a landscape mode in response to a request of the APP output device 200. According to various embodiments of the present disclosure, the for screens of APPs being performed through background processing as well as the screen of the specific APP being output on the display unit 140, the APP operating unit 161 may control a change of a landscape or portrait mode of the APP differentiated by the input signal from the APP output device 200.

The APP operating unit 161 may also apply both the input signal from the input device and the input signal from the APP output device 200 to a single APP. The APP operating unit 161 may sequentially apply the respective input signals to the single APP according to a reception time of the input signals to be transferred.

The APP operating unit 161 may set an output size of a specific APP to be larger than an area of the display unit 140 of the APP operating device 100. For example, assuming that the display unit 140 has a full size of 10×10, the APP operating unit 161 may output a screen having a size of 10×10 according to the received input signal and may change a size of the running APP to a size of 20×20.

According to various embodiments of the present disclosure, the APP operating unit 161 may allocate additional data to the expanded area. The APP operating unit 161 may perform data processing for an area which is not currently displayed on the display unit 140 through background processing to thereby support a data update of the corresponding area. Consequently, the APP operating unit 161 may set the APP screen to have a larger size in the memory, and may perform data writing suitable for the set size of the APP screen. Meanwhile, the APP operating unit 161 may support an output of only the area corresponding to the size of the display unit 140 and may support data updating for the remaining area. The APP operating unit 161 may control a memory allocation size for an adjustment of the above-described APP screen. Namely, the APP operating unit 161 may expand and allocate the memory area to write data having a size larger than the display unit 140.

The APP data collecting unit 163 collects APP data generated while the APP operating unit 161 operates at least one APP. For example, if APP data is recorded in the memory by APPs activated by the APP operating unit 161, then the APP data collecting unit 163 may collect the corresponding APP data. According to various embodiments of the present disclosure, the APP data collecting unit 163 may collect the whole APP data of all APPs recorded in the memory. Alternatively, the APP data collecting unit 163 may also collect only some of the APP data of all the APPs. For example, if five APPs are in an activation status, then the APP data collecting unit 163 may collect the respective five APP data. Alternatively, the APP data collecting unit 163 may collect only some APP data selected to be transmitted to the APP output device 200 among the five APP data.

Meanwhile, if the APP data is updated after the APP data collecting unit 163 collects the respective APP data, then the APP data collecting unit 163 may collect only the updated APP. The respective APP data collected by the APP data collecting unit 163 may be transferred to the APP output device 200 through the connection interface 170. According to various embodiments of the present disclosure, the APP data collecting unit 163 may provide, to the APP output device 200, the APP data including index information or identification information to be differentiated by the APP output device 200.

Further, the buffer operating unit 165 may allocate separate distinguishable buffers so as to provide the respective APP data to the APP output device 200. The APP data collecting unit 163 may record the corresponding APP data in the respective buffers to provide the APP data to the APP output device 200. For example, the buffer operating unit 165 may allocate buffers to five APPs, respectively, and the APP data collecting unit 163 may record APP data of the APPs in the respective buffers. According to various embodiments of the present disclosure, during the process of the buffer operating unit 165 allocating buffers for the respective APP data, the buffer operating unit 165 may allocate a new buffer when a new APP is activated, and may withdraw the allocated buffer when the APP in an activation status is terminated.

The APP data transmitting unit 167 may transmit the APP data collected by the APP data collecting unit 163 to the APP output device 200. Further, the APP data transmitting unit 167 may transmit the updated APP data collected by the APP data collecting unit 163 to the APP output device 200. According to various embodiments of the present disclosure, the APP data transmitting unit 167 may control formation of a communication channel with the APP output device 200 connected to the connection interface 170. According to various embodiments of the present disclosure, the APP data transmitting unit 167 may control formation of at least one of a wired communication channel and a wireless communication channel. The APP data transmitting unit 167 may use at least one communication channel for transmission of the respective APP data.

For example, the APP data transmitting unit 167 may create at least one of various communication channels including a WiFi communication channel, a USB communication channel, a UART communication channel, a BT communication channel, and/or the like between the APP data transmitting unit 167 and the APP output device 200. The APP data transmitting unit 167 may transmit some of the APP data to the APP output device 200 through a USB communication channel and may transmit other APP data to the APP output device 200 through a BT communication channel. Further, the APP data transmitting unit 167 may transmit the remaining APP data to the APP output device 200 through a WiFi communication channel, a UART communication channel, and/or the like.

Figure 4:
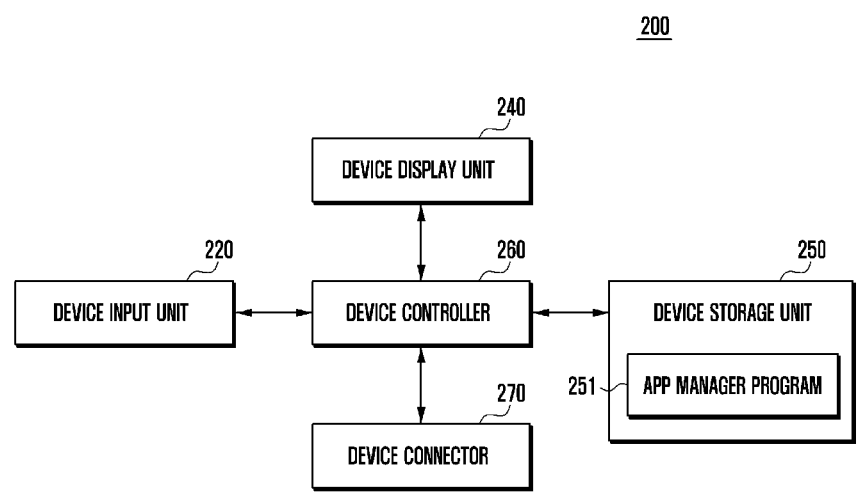
FIG. 4 is a block diagram illustrating an APP output device according to an embodiment of the present disclosure.

FIG. 4 is a block diagram illustrating an APP output device according to an embodiment of the present disclosure.

Referring to FIG. 4, the APP output device 200 may include a device input unit 220, a device display unit 240, a device storage unit 250, a device controller 260, and a device connector 270.

According to various embodiments of the present disclosure, the device input unit 220 may support generation of an input signal of the APP output device 200. The device input unit 220 may include various mechanical devices such as, for example, a keyboard, a mouse, a voice input device, an electronic pen, and/or the like. In addition, if the device display unit 240 is configured in the form of a touch screen including a touch panel, then the device input unit 220 may include the device display unit as an input unit. The device input unit 220 may generate an input signal for operating specific APPs of the APP operating device 100, which is output through the APP output device 200.

For example, the device input unit 220 may generate an input signal for selecting an APP area corresponding to at least one APP being operated in the APP operating device 100, an input signal for operating the APP corresponding to the selected APP area, an input signal for switching an APP display mode corresponding to the selected APP area according to a usercontrol, and/or the like. Further, the device input unit 220 may generate an input signal for requesting activation of a specific APP which may be operated in the APP operating device 100, an input signal for at least one of a size adjustment and a position change of a specific APP area, an input signal for stopping a running APP, an input signal for terminating an APP in an activation status according to a usercontrol, and/or the like. The input signal generated by the device input unit 220 may be transferred to the APP operating device 100 under the control of the device controller 260.

According to various embodiments of the present disclosure, the device display unit 240 may output various screens for operation of the APP output device 200. For example, the device display unit 240 may output a standby screen, an icon screen, a menu screen, and/or the like for the operation of the APP output device 200. The device display unit 240 may output an APP area corresponding to at least one APP data provided by the APP operating device 100. The APP area output on the display unit 140 may be displayed in a predetermined area according to setting information. A location of the APP area may be changed according to an input signal of the device input unit 220. Further, a size of the APP area may be changed according to an input signal of the device input unit 220. A screen interface output through the device display unit 240 will be described below more specifically with reference to the accompanying drawings.

According to various embodiments of the present disclosure, the device storage unit 250 may store various application programs and data required for the operation of the APP output device 200. For example, the device display unit 250 may include an operating system for the operation of the APP output device 200. Further, the device storage unit 250 may store a program for supporting an output of APP data being operated in the APP operating device 100 to a predetermined APP area. For example, the device storage unit 250 may include a APP manager program 251.

According to various embodiments of the present disclosure, the APP manager program 251 may include a connection support routine through a connection with the APP operating device 100, a routine for controlling an output of an APP area corresponding to at least one APP data received from the APP operating device 100, and/or the like. Further, the APP manager program 251 may include a routine for adjusting a location and a size of an APP area according to an input signal, a routine for transmitting an input signal from the device input unit 220 to the APP operating device 100, a routine for updating displaying of an APP area according to reception of an updated APP data, and/or the like. Further, the APP manager program 251 may include a routine for grasping a display mode of a specific APP and for supporting display of an APP area according to the corresponding display mode, a routine for supporting switching of the display mode of the specific APP, and/or the like.

According to various embodiments of the present disclosure, the device connector 270 supports a connection with the APP operating device 100. The device connector 270 may be configured with at least one interface to support the connection with the APP operating device 100. For example, the device connector 270 may include at least one of a serial connection interface connected through a cable such as a USB interface, a UART interface, and/or the like, and a wireless communication interface such as a BT interface, a Zigbee interface, a UWB interface, and/or the like.

The device controller 260 may control transference of a control signal for controlling the APP output device 200, data processing, APP data buffering, an output of an APP area related to APP data, and collection and transference of an input signal. According to various embodiments of the present disclosure, the device controller 260 may include a configuration such as the configuration illustrated in FIG. 5.

Figure 5:
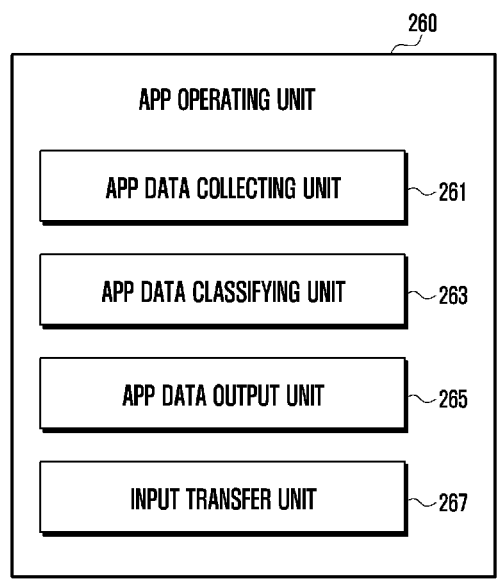
FIG. 5 is a block diagram illustrating a controller of an APP output device according to the embodiment of the present disclosure.

FIG. 5 is a block diagram illustrating a controller of an APP output device according to an embodiment of the present disclosure.

Referring to FIG. 5, if the APP operating device 100 is connected through the device connector 270, then the device controller 260 may activate the APP manager program 251 for the connection. The device controller 260 may serve as an APP manager by the APP manager program 251. According to various embodiments of the present disclosure, the device controller 260 may include an APP data receiving unit 261, an APP data classifying unit 263, an APP data output unit 265, and an input transfer unit 267.

If the APP operating device 100 is connected through the device connector 270, then the APP data receiving unit 261 may perform signal processing for a connection with the APP operating device 100. The APP data receiving unit 261 may receive APP data from the APP operating device 100. According to various embodiments of the present disclosure, the APP data receiving unit 261 may receive APP data stored in separate buffers from the respective buffers or may receive the whole APP data having identification information. The APP data receiving unit 261 provides the received APP data to the APP data classifying unit 263.

According to various embodiments of the present disclosure, the APP data classifying unit 263 identifies the received APP data and classifies the received APP data for each of APPs. For example, according to various embodiments of the present disclosure, the APP data classifying unit 263 may determine information of the buffer having received the corresponding APP data, or may determine identification information of the corresponding APP data. The APP data classifying unit 263 may load the respective APP data in a memory allocated to the device display unit 240 of the APP output device 200. According to various embodiments of the present disclosure, the APP data classifying unit 263 may configure APP areas corresponding to the respective APP data according to setting information and may load the APP areas in the memory.

According to various embodiments of the present disclosure, the APP data output unit 265 outputs the APP areas classified and loaded in the memory by the APP data classifying unit 263 to the device display unit 240. The APP data output unit 265 may output the APP areas loaded in the memory to a predetermined area of the device display unit 240 according to setting information. For example, the APP data output unit 265 may output the respective APP areas to the device display unit 240 according to an input signal received from the device input unit 220. Further, the APP data output unit 265 may automatically output the respective APP areas to a predetermined area of the device display unit 240 according to the input signal received from the device input unit 220. According to various embodiments of the present disclosure, the APP data output unit 265 may determine display mode information of the respective APP data, and may output the APP data according to any one of a landscape mode and a portrait mode. Further, the APP data output unit 265 may support an output of a hidden area, which is not output on the display unit 140 of the APP operating device 100, to the device display unit 240. Meanwhile, the APP data output unit 265 may output a list including APP items that can be operated in the APP operating device 100.

According to various embodiments of the present disclosure, the input transfer unit 267 may collect an input signal that is input from the device input unit 220, and may provide the input signal to the APP operating device 100 through the device connector 270. According to various embodiments of the present disclosure, the input transfer unit 267 may transmit, to the APP operating device 100, a type of the input signal and APP ID information to which the input signal will be applied. For example, the input transfer unit 267 may collect an APP area selection signal, an input signal for operating a specific APP and an input signal for changing an APP display mode, and may transfer the collected signals to the APP operating device. The input signal for operating the APP may include a text input signal, a specific link selection signal output to the APP area, an input signal for inputting a specific image, a voice signal, and/or the like. For transference of a voice signal, the APP output device 200 may further include a microphone for collecting the voice signal.

Figure 6:
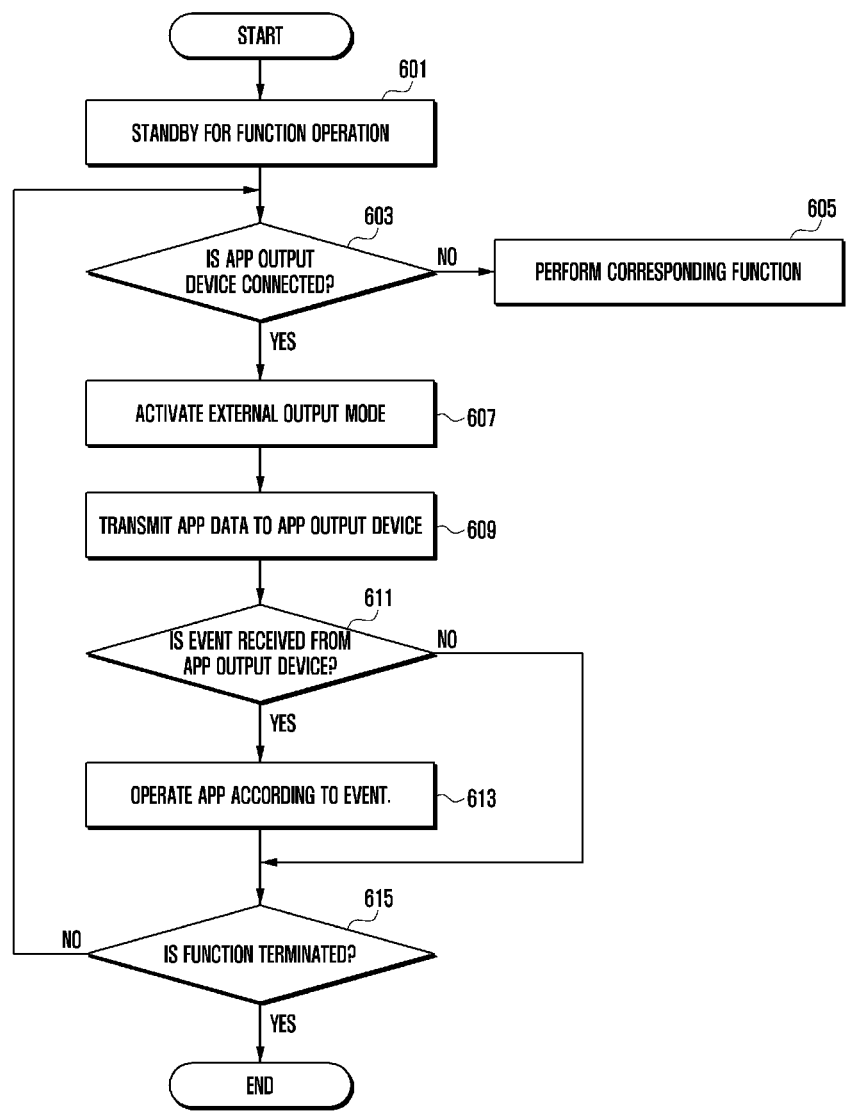
FIG. 6 is a flowchart illustrating a method of controlling an APP operating device according to an embodiment of the present disclosure.

FIG. 6 is a flowchart illustrating a method of controlling an APP operating device in operation of APPs according to an embodiment of the present disclosure.

Referring to FIG. 6, in the method of controlling the APP operating device according to various embodiments of the present disclosure, at operation 601, the controller 160 of the APP operating device 100 is in standby for a function operation. According to various embodiments of the present disclosure, the standby status for the function operation may be a status in which electrical power is supplied and booting is completed. Alternatively, the standby status for the function operation may be a status in which a standby screen is output, or a status in which a menu or icon is output. Further, the standby status for the function operation may also be a status in which another application program, for example, a music file, a video file, and/or the like is reproduced or a status in which a function for broadcast reception or a function for file editing is executed.

If the controller 160 receives a specific event is received, then at operation 603, the controller 160 may determine whether the specific event corresponds to connection of an APP output device. For example, if the controller 160 receives a specific event, then the controller 160 may determine whether the corresponding event is an event corresponding to a connection of the APP output device 200. According to various embodiments of the present disclosure, the APP operating device 100 may include a circuit capable of recognizing the connection of the APP output device 200 when the APP output device 200 is connected. For example, the APP operating device 100 may provide a pull-up voltage to the connection interface 170 to which the APP output device 200 is connected and may determine the connection of the APP output device 200 according to a change in the corresponding voltage.

If the controller 160 determines that the event does not correspond to connection of an APP output device at operation 603, then the controller 160 may proceed to operation 605 at which the controller 160 may perform a corresponding function. For example, when an event not related to the connection of the APP output device 200 occurs in operation 603, the controller 160 proceeds to operation 605 and may support performance of a function according to a type and a characteristic of the event. For example, the controller 160 may support performance of at least one of a file reproducing function, a web connection function, a file editing function, a broadcast receiving function, and/or the like according to the corresponding event.

If the controller 160 determines that the event corresponds to the connection of an APP output device at operation 603, then the controller 160 may proceed to operation 607 at which the controller 160 activates an external output mode. For example, if the controller 160 determines that the APP output device 200 has occurred, then the controller 160 may perform activation of an external output mode, in operation 607. According to various embodiments of the present disclosure, the external output mode may be automatically performed when the APP output device 200 is connected. Alternatively, when the APP output device 200 is connected, an identification window for inquiring whether the external output mode based on the APP output device 200 is to be performed is output by the controller 160 and thereafter, the external output mode may be activated according to approval of a user. For example, the controller 160 may prompt the user for an indication as to whether to perform the external output mode.

At operation 609, the controller 160 may control running APP data to be transmitted to the APP output device 200. According to various embodiments of the present disclosure, the controller 160 may transmit APP data for the whole APPs being currently activated as a default to the APP output device 200. Namely, the controller 160 may transmit single APP data to the APP output device 200 when a single APP is activated, and may transmit a plurality of APP data to the APP output device 200 when a plurality of APPs are in an activation status. According to various embodiments of the present disclosure, during the process of transmitting APP data to the APP output device 200, the controller 160 may transmit APP data according to a display mode for each of the APPs. Namely, the controller 160 may transmit APP data according to a landscape mode display state to an APP in the landscape mode display state, and may transmit APP data according to a portrait mode display state for an APP in the portrait mode display state.

Meanwhile, the controller 160 may also transmit only APP data for some of a plurality of APPs to the APP output device 200. According to various embodiments of the present disclosure, the controller 160 may provide a selection menu capable of selecting an APP to be transmitted to the APP output device 200 among currently running APPs. Meanwhile, if there is no separate APP in an activation status, then the controller 160 may transmit a standby screen or a preset basic area to the APP output device 200. According to various embodiments of the present disclosure, the basic area may be a screen for providing a list in which activation of at least one of a plurality of APPs of the APP operating device 100 may be selected or a screen in which at least one icon or menu item is arranged.

At operation 611, the controller 160 determines whether an event is received from the APP output device 200. For example, the controller 160 determines whether there is event signal reception. According to various embodiments of the present disclosure, during the process of determining whether an event is received from the APP output device 200, the controller 160 may determine whether an event signal is received from at least one of the APP operating device 100 and the APP output device 200. For example, the controller 160 may determine whether a text input signal, an image input signal, a direction key input signal, a mouse input signal, a touch input signal, a sensor input signal, and/or the like, which are input from at least one input unit of the APP operating device 100 and the APP output device 200, are generated.

Further, the controller 160 may determine whether an event signal generated from schedule information set in at least one of the APP operating device 100 and the APP output device 200 is received. For example, the controller 160 may determine whether an event signal corresponding to timer completion is generated from at least one of the APP operating device 100 and the APP output device 200.

If the controller 160 determines that an event is received from the APP output device, then the controller 160 may proceed to operation 613 at which the controller 160 may perform an APP operation according to the corresponding event signal.

In contrast, if the controller 160 determines that an event is not received from the APP output device 200, then the controller 160 may proceed to operation 615.

According to various embodiments of the present disclosure, the controller 160 may apply the input signal generated from the APP operating device 100 to an APP running as a default. The controller 160 may transmit, to the APP output device 200, APP data updated according to the application of the input signal to the running APP. Meanwhile, when receiving an input signal from the APP output device 200, the controller 160 may determine the type of an APP designated by the corresponding input signal. The controller 160 may perform APP operation by applying the corresponding input signal to the determined APP. The controller 160 may transmit the updated APP data of the APP to which the input signal has been applied to the APP output device 200. According to various embodiments of the present disclosure, the controller 160 may perform application of the input signal from the APP output device 200 to the APP through background processing. Alternatively, the controller 160 may also change an APP in an execution status in response to an input signal in the APP operating device 100 and apply the corresponding input signal to the APP changed to an execution status.

If the controller 160 does not receive a separate event signal at operation 611, then the controller 160 may skip operation 613. After operation 613, at operation 615, the controller 160 may determine whether an event for terminating the function according to the external output mode is generated. For example, the controller 160 may determine whether an event according to a disconnection between the APP output device 200 and the APP operating device 100 is generated. Alternatively, the controller 160 may determine whether a separate input signal for terminating the external output mode provided from the APP operating device 100 is generated.

If the controller 160 determines that the separate input signal is not generated at operation 615, then the controller 160 may return to operation 603 and execute the following operations again.

Figure 7:
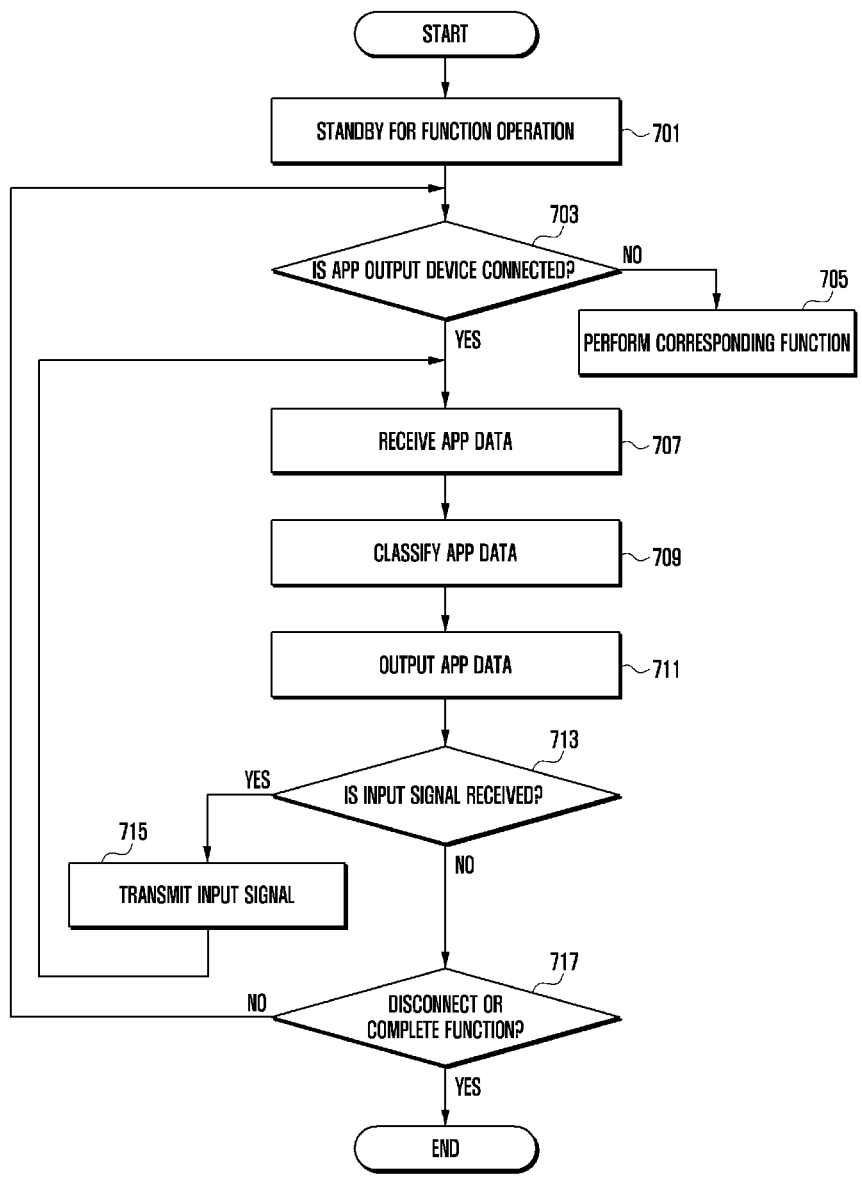
FIG. 7 is a flowchart illustrating a method of controlling an APP output device according to an embodiment of the present disclosure.

FIG. 7 is a flowchart illustrating a method of controlling an APP output device according to an embodiment of the present disclosure.

Referring to FIG. 7, at operation 701, the device controller 260 may be on standby for a function operation. According to various embodiments of the present disclosure, the device controller 260 may complete booting according to power supply and may be in a user input standby status. Alternatively, the device controller 260 may also be on standby for support of an external output mode of the APP operating device while performing a specific user function or being in a sleep status.

At operation 703, the device controller 260 determines whether an event corresponding to a connection of the APP operating device 100 is generated. For example, at operation 703, the device controller 260 determines whether an APP output device is connected.

If the device controller 260 determines that the event corresponding to a connection of the APP operating device 100 is not generated at operation, then the device controller 260 may proceed to operation 705 at which the device controller 260 performs a corresponding function. For example, the device controller 260 may support the APP output device 200 in performing a user function. For example, the device controller 260 may support performance of a web connection function according to an input signal that is input from the device input unit 220 of the APP output device or a function of reproducing or editing a specific file. Alternatively, the device controller 260 may also control such that the standby status for the function operation in previous operation 701 is maintained.

If the device controller 260 determines that an APP output device is connected at operation 703, then the device controller 260 may proceed to operation 707 at which the device controller 260 receives APP data. For example, if the event corresponding to the connection with the APP operating device 100 is generated in operation 703, then the device controller 260 proceeds to operation 707 to receive APP data from the connected APP operating device 100. According to various embodiments of the present disclosure, the device controller 260 may perform data processing according to the connection in the process of the connection with the APP operating device 100. For example, the device controller 260 may form a communication channel with the APP operating device 100 corresponding to at least one of a communication method designated by a user and a set communication method. The device controller 260 may perform setting for data transmission and reception. The device controller 260 may receive APP data provided as a default by the APP operating device 100. Further, the device controller 260 may provide a list of APPs that can be activated in the APP operating device 100 and may request activation of items selected by a user request from the APP operating device 100. The device controller 260 may also receive the APP data for which the activation has been requested.

At operation 709, the device controller 260 may classify the APP data. According to various embodiments of the present disclosure, the device controller 260 may determine buffer identification information allocated for transmission of the respective APP data according to a method of providing APP data. Further, the device controller 260 may determine identification information defined for differentiation of the APP data. The device controller 260 may classify the respective APPs based on the identification information.

At operation 711, the device controller 260 may output the APP data. According to various embodiments of the present disclosure, in a case in which the APP data corresponds to a plurality of APPs, the device controller 260 may control the respective APPs to be output in differentiated APP areas. The device controller 260 may randomly select an output position in the device display unit 240 in a process of outputting at least one APP area. Further, the device controller 260 may control such that a previously defined form, for example, an APP area of an APP running in the APP operating device 100 is arranged at the center of the device display unit 240 and APP areas of the remaining activated APPs are arranged at an outer periphery of the device display unit 240. Further, in a case in which there is a display history of the corresponding APP area on the device display unit 240, the device controller 260 may store and manage the display history, and may support an output of the APP area to a location according to the corresponding display history based on the display history. When outputting the APP areas, the device controller 260 may output the APP areas such that the APP areas do not overlap each other. However, various embodiments of the present disclosure renot limited thereto. Namely, the device controller 260 may also output the APP areas such that at least some of the APP areas do not overlap each other. The device controller 260 may support a location change and a size change of the APP areas according to an input signal that is input from the device input device 220.

Thereafter, at operation 713, the device controller 260 may determine whether an input signal is received from the device input unit 220 or the device display unit 240 having an input function.

If the device controller 260 determines that a specific input signal is generated at operation 713, then the device controller 260 may proceed to operation 715 at which the device controller 260 may transmit the corresponding input signal to the APP operating device 100. Thereafter, the device controller 260 returns to operation 707 to perform the following operations again.

According to various embodiments of the present disclosure, the device controller 260 may collect and transmit only the input signal related to an APP operation without providing all the input signals to the APP operating device 100. For example, the device controller 260 may collect a mouse input signal in an APP area displayed on the device display unit 240, a keyboard input signal in a state in which a mouse is located in an APP area and a mouse, keyboard or voice input signal that is input in a state in which a specific APP area is selected, and may provide the collected input signals to the APP operating device 100. When an input signal for indicating an area of the device display unit 240 other than the APP area or an input signal for selecting a inherent user function of the APP output device 200 is generated, the device controller 260 may control such that the input signal is not transmitted to the APP operating device 100. The device controller 260 may control the corresponding input signal to be applied to the user function of the APP output device 200.

If the device controller 260 determines that the input signal is not received at operation 713, then the device controller 260 may proceed to operation 717 at which the device controller 260 may determine whether an event for a disconnection or function completion of the APP operating device 100 is generated.

If the device controller 260 determines that an input signal or event for a disconnection or function completion fo the APP is not generated at operation 717, then the device controller 260 may return to operation 703 and execute the following operations again.

Figure 8:
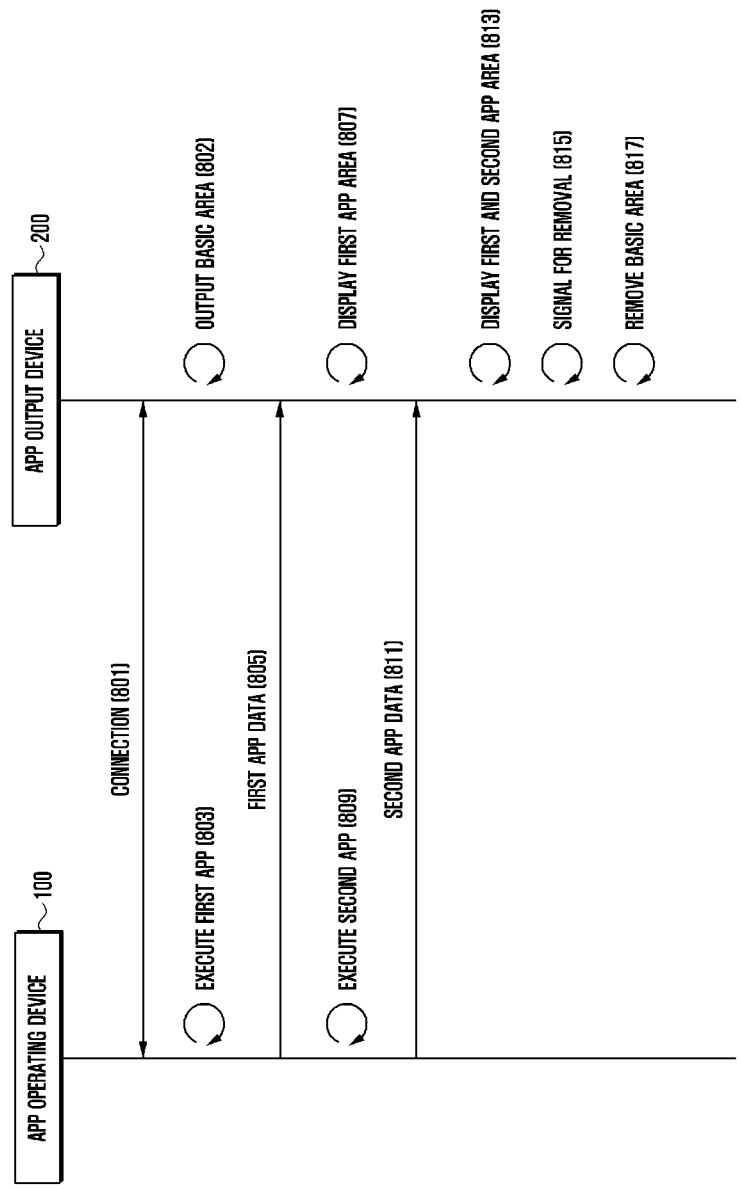
FIG. 8 is a signal flow diagram illustrating a method of displaying a plurality of APP areas among APP operation methods according to an embodiment of the present disclosure.

FIG. 8 is a signal flow diagram illustrating a method of displaying a plurality of APP areas among APP operation methods according to an embodiment of the present disclosure.

Referring to FIG. 8, at operation 801, an APP operating device 100 and an APP output device 200 may be connected with each other. According to various embodiments of the present disclosure, the APP operating device 100 and the APP output device 200 may be connected in a wired and/or wireless manner. The APP operating device 100 and the APP output device 200 may perform operation of setting a communication channel for data transmission and reception.

At operation 802, the APP output device 200 may output a basic area. To this end, the APP output device 200 may receive APP data for the basic area from the APP operating device 100. According to various embodiments of the present disclosure, the basic area may be an area implemented with APP data corresponding to a standby screen, a menu screen, an icon screen, and/or the like which is provided by the APP operating device 100.

At operation 803, the APP operating device 100 may execute a first APP. According to various embodiments of the present disclosure, the APP operating device 100 may execute the first APP according to an input signal from an input unit 120 or a display unit 140 or according to a request of the APP output device 200. The APP output device 200 may request the execution of the first APP through a selection of an icon or a menu item provided in the basic area.

At operation 805, the APP operating device 100 may transmit first APP data to the APP output device 200.

If the APP output device 200 receives the first APP data, then at operation 807, the APP output device 200 may display a first APP area on a device display unit 240.

At operation 809, the APP operating device 100 may execute a second APP according to an input signal from the APP output device 200 or an input signal generated in the APP operating device 100.

If the second APP is executed, then at operation 811, the APP operating device 100 may transmit second APP data to the APP output device 200. According to various embodiments of the present disclosure, the APP operating device 100 may change the first APP from an execution status to an activation status and may switch the first APP to a background processing status. The APP operating device 100 may maintain the second APP in an execution status.

At operation 813, APP output device 200 displays the first APP area and a second APP area on the device display unit 240. According to various embodiments of the present disclosure, the APP output device 200 may display the first and second APP areas in a state in which the second APP area is selected.

At operation 815, an input signal for removing the basic area may be generated.

If an input signal for removing the basic area is generated at operation 815, then at operation 817, the APP output device 200 may remove the basic area.

Figure 9:
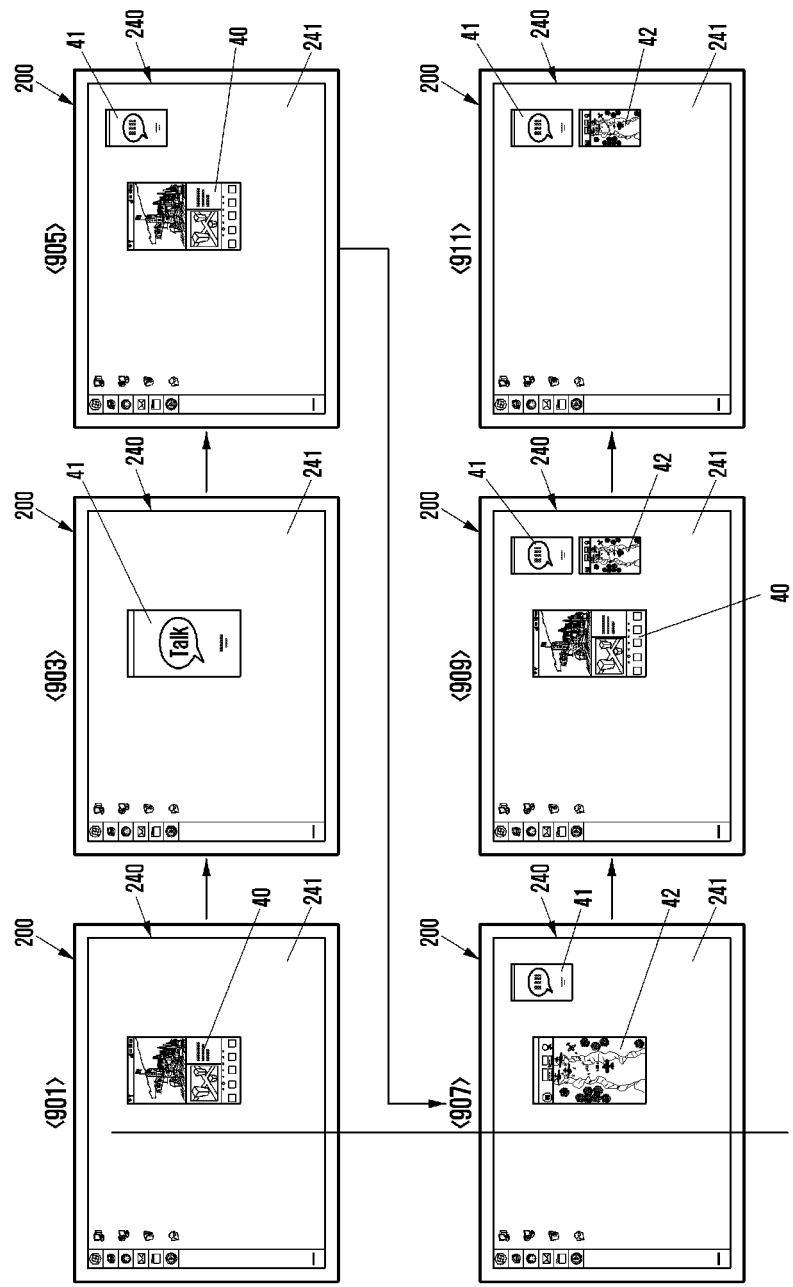
FIG. 9 illustrates an example of an interface for displaying a plurality of APP areas among APP operation functions according to an embodiment of the present disclosure.

FIG. 9 illustrates an example of an interface for displaying a plurality of APP areas among APP operation functions according to an embodiment of the present disclosure.

Referring to FIG. 9, when performing an external output mode according to a connection with an APP operating device 100, a device display unit 240 may output a basic area 40 on a basic screen 241 of the device display unit 240 as illustrated on a screen 901. According to various embodiments of the present disclosure, the basic screen may be a standby screen provided for operation of an APP output device 200. Alternatively, the basic screen may be a specific user function screen that can be executed in the APP output device 200. The basic area 40 may be a standby screen or a menu screen provided for operation of the APP operating device 100. The basic area 40 may be displayed at a specific location of the basic screen 241. The basic area 40 is arranged in the vicinity of a center of the basic screen 241 as illustrated on the screen 901.

According to various embodiments of the present disclosure, if a first APP is executed in the APP operating device 100, then the basic area 40 may be changed to a first APP area 41 as illustrated on a screen 903. This status may be a status in which the first APP area 41 is superposed on the basic area 40.

If an input signal for separating the first APP area 41 is generated, then a device controller 260 may separate the first APP area 41 from the basic area 40, move the first APP area 41 to a predetermined area, and display the first APP area 41 as illustrated on a screen 905. For example, if a user selects the first APP area 41 and generates an input signal for dragging the first APP area 41 to an upper right corner of the basic screen 241, then the first APP area 41 may be separated from a location at which the basic area 40 is displayed, moved to the corresponding location, and displayed at the corresponding location. According to various embodiments of the present disclosure, the first APP area 41 may be automatically reduced to a set size. Alternatively, the first APP area 41 may be maintained at the same size as the basic area 40.

If a second APP is executed in the APP operating device 100, then a second APP area 42 may be output on the basic area 40 as illustrated on a screen 907. Alternatively, the basic area 40 may be changed to the second APP area 42.

If an input signal for moving the second APP area 42 is generated, then the device controller 260 may support an output of the second APP area 42 to a predetermined area of the device display unit 240 as illustrated on a screen 909. According to various embodiments of the present disclosure, the second APP area 42 may be moved by a mouse or touch and drag signal generation as mentioned above. Alternatively, if a tap signal, a direction key signal of a keyboard or a mouse button input signal is generated on an area at which the second APP area 42 is displayed, the second APP area 42 may be automatically moved to a designated location.

If an input signal for removing the basic area 40 is generated, then the device controller 260 may remove the basic area 40 from the basic screen 241 as illustrated on a screen 911. Accordingly, the device display unit 240 may display only the first and second APP areas 41 and 42. The input signal for removing the basic area 40 may be generated in at least one of the APP operating device 100 and the APP output device 200.

Figure 10:
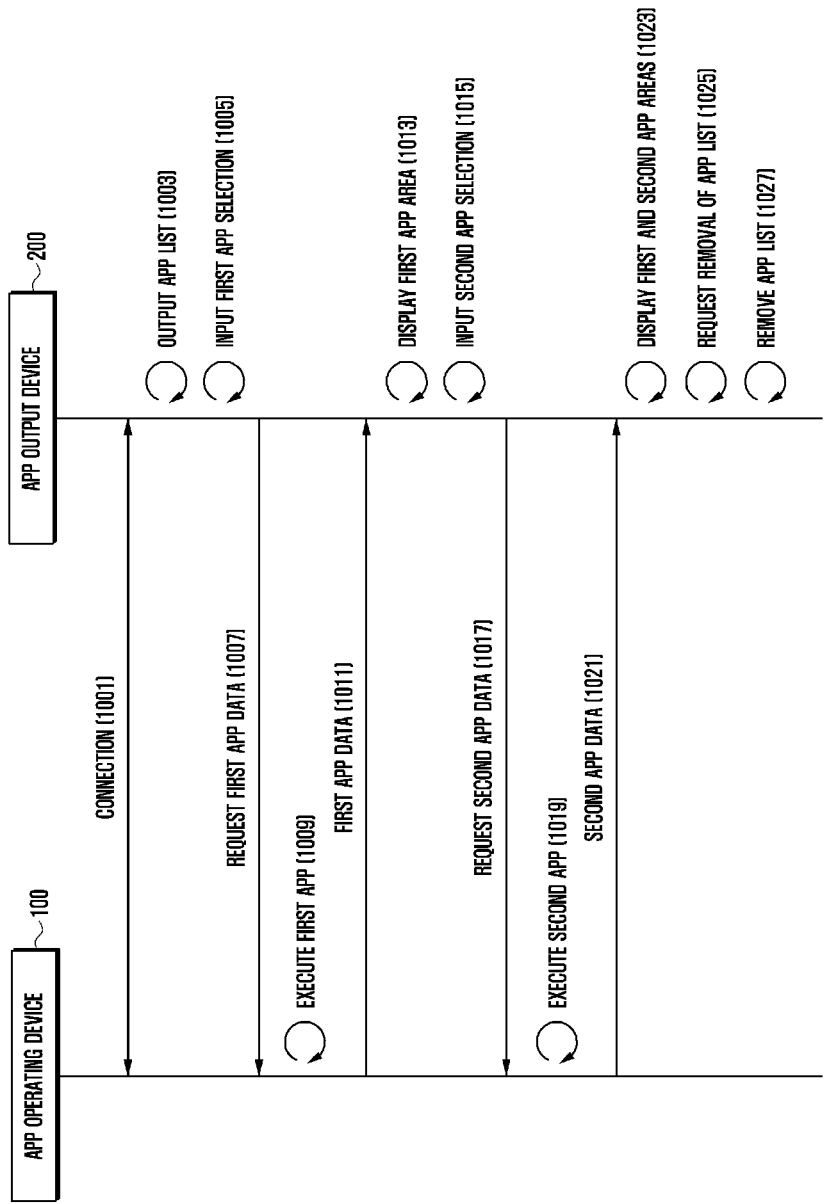
FIG. 10 is a signal flow diagram illustrating a method of displaying a plurality of APP areas based on a list among APP operation methods according to an embodiment of the present disclosure.

FIG. 10 illustrates a method of displaying a plurality of APP areas based on a list among APP operation methods according to an embodiment of the present disclosure.

Referring to FIG. 10, at operation 1001, an APP operating device 100 and an APP output device 200 may perform a connection process as described above.

Thereafter, at operation 1003, the APP output device 200 may output an APP list. According to various embodiments of the present disclosure, the APP list may be provided by the APP operating device 100. The APP list may be a list including APP items that can be operated in the APP operating device 100.

At operation 1005, the APP output device 200 may receive an input for selecting a first APP. A user may generate an input signal for selecting a first APP item included in the APP list by using a mouse, a keyboard, and/or another input device.

At operation 1007, the APP output device 200 may transmit a request for a first APP data to the APP operating device 100.

At operation 1009, the APP operating device 100 may execute the first APP in response to the request for the first APP data.

At operation 1011, the APP operating device 100 may transmit the first APP data generated according to the execution of the first APP to the APP output device 200.

At operation 1013, the APP output device 200 may display a first APP area corresponding to the first APP data on a device display unit 240.

At operation 1015, the APP output device 200 may receive an input signal for selecting a second APP in the APP list.

At operation 1017, the APP output device 200 may transmit a request message for a second APP data to the APP operating device 100 in operation 1017.

At operation 1019, the APP operating device 100 may execute the second APP in response to the request for the second APP data.

At operation 1021, the APP operating device 100 may transmit the second APP data generated according to the execution of the second APP to the APP output device 200. According to various embodiments of the present disclosure, during the operation of transmitting the second APP data generated according to the execution of the second APP to the APP output device 200, the APP operating device 100 may change the first APP from an execution status to an activation status. The APP operating device 100 may switch the operation of the first APP to background processing. If first APP data updated by the operation of the first APP is generated, then the APP operating device 100 may transmit the updated first APP data to the APP output device 200 according to setting information or an input signal.

At operation 1023, the APP output device 200 may display the first and second APP areas. According to various embodiments of the present disclosure, if no updated APP data is received, the first APP area may be maintained in the previous output status.

At operation 1025, the APP output device 200 receives a request for removing the APP list in operation 1025.

Thereafter, at operation 1027, the APP output device 200 may remove the APP list.

Figure 11:
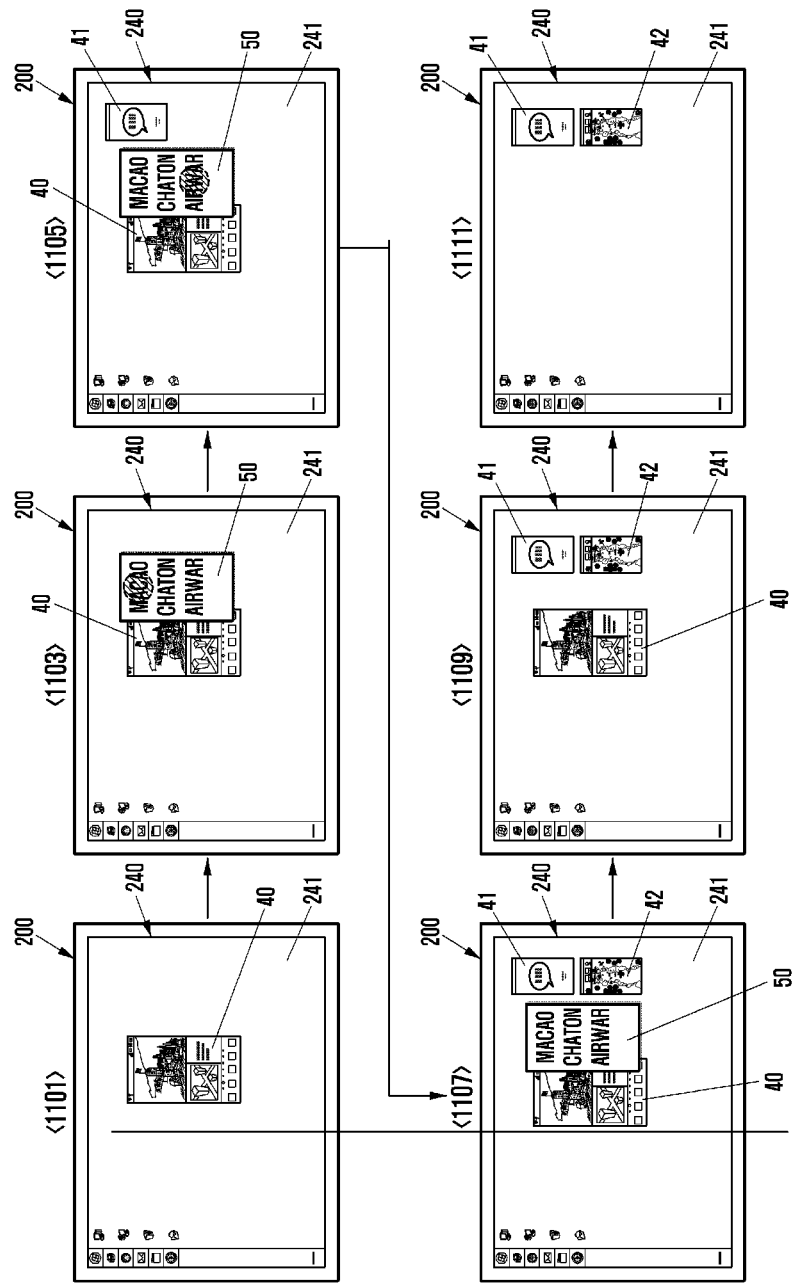
FIG. 11 illustrates an example of a screen interface for displaying a plurality of APP areas based on a list among APP operation functions according to an embodiment of the present disclosure.

FIG. 11 illustrates an example of a screen interface for displaying a plurality of APP areas based on a list among APP operation functions according to an embodiment of the present disclosure.

Referring to FIG. 11, an APP output device 200 may receive APP data corresponding to a basic area 40 from an APP operating device 100. Then, the APP output device 200 may support an output of the basic area 40 to a predetermined area of a basic screen 241 of a device display unit 240 as illustrated on a screen 1101.

The APP output device 200 may output an APP list 50 according to a user request or as a default as illustrated on a screen 1103. The APP list 50 may be output to an area adjacent to the basic area 40. Although the APP output device 200 displays the APP list 50 together with the basic area 40, various embodiments of the present disclosure are not limited thereto. Namely, the APP output device 200 may also directly output the APP list 50 without outputting the basic area 40 on the screen 1011.

The APP output device 200 may receive an input signal for selecting a specific APP, for example, a first APP in the APP list 50. Then, the APP output device 200 may transmit a first APP selection signal to the APP operating device 100. The APP output device 200 may receive first APP data from the APP operating device 100. The APP output device 200 may output a first APP area 41 corresponding to the first APP data on a side of the basic screen 241 as illustrated on a screen 1105. According to various embodiments of the present disclosure, the first APP area 41 may be output in a predetermined area not overlapping with the basic area 40 and the APP list 50.

The APP output device 200 may receive an input signal for selecting a second APP in the APP list 50. Then, the APP output device 200 may transmit the input signal for selecting the second APP to the APP operating device 100. The APP output device 200 may receive second APP data and may output a second APP area 42 as illustrated on a screen 1107. Accordingly, the APP output device 200 may output the basic area 40, the APP list 50, the first APP area 41 and the second APP area 42 on the basic screen 241.

If the APP output device 200 receives an input signal for removing the APP list 50, then the APP output device 200 may remove the APP list 50 from the basic screen 241 as illustrated on a screen 1109. According to various embodiments of the present disclosure, if the APP output device 200 receives an input signal for outputting the APP list 50, then the APP output device 200 may display the APP list 50 on the basic screen 241 again as illustrated on a screen 1103. Further, if the APP output device 200 receives an input signal for removing the basic area 40, then the APP output device 200 may remove the basic area 40 from the basic screen 241 as illustrated on a screen 1111. Accordingly, as an example, the device display unit 240 may display the first and second APP areas 41 and 42 on a side of a screen 1111 without displaying the basic area 40. For example, the device display unit 240 may display only the first and second APP areas 41 and 42 on a side of a screen 1111.

Figure 12:
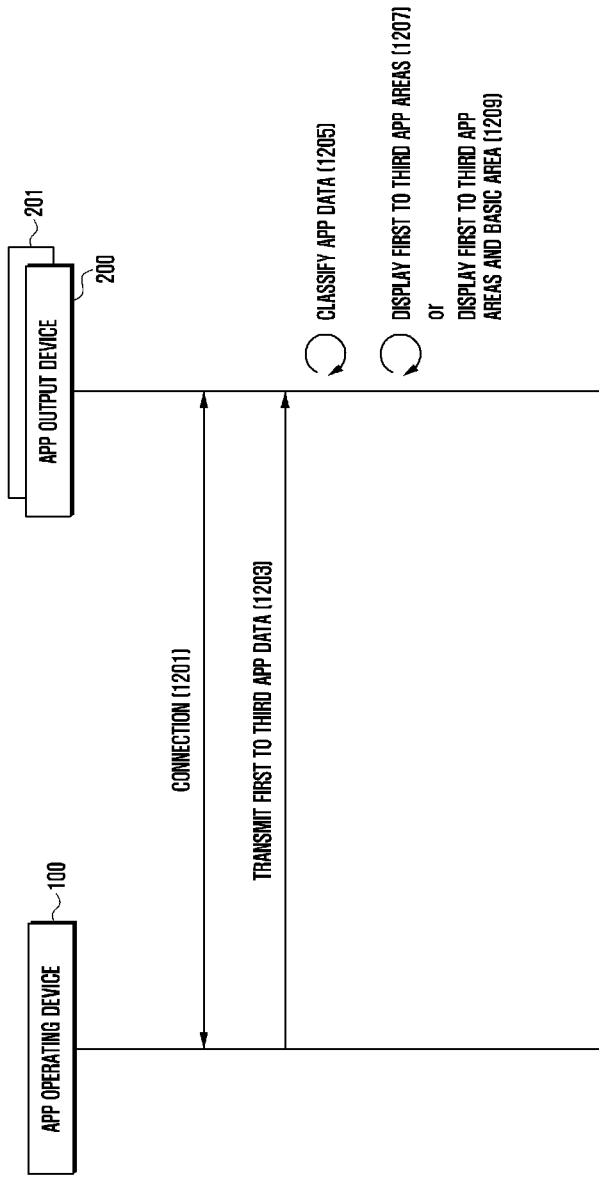
FIG. 12 is a signal flow diagram illustrating a method of automatically displaying a plurality of APP areas among APP operation methods according to an embodiment of the present disclosure.

FIG. 12 is a signal flow diagram illustrating a method of automatically displaying a plurality of APP areas among APP operation methods according to an embodiment of the present disclosure.

Referring to FIG. 12, at operation 1201, an APP operating device 100 and APP output devices 200 and 201 may perform a connection process. For the connection, the APP operating device 100 and the APP output devices 200 and 201 may be connected in at least one of a wired connection and a wireless connection.

If the connection between the APP operating device 100 and the APP output devices 200 and 201 is set at operation 1201, then, at operation 1203, the APP operating device 100 may transmit first to third APP data to at least one of the APP output devices 200 and 201. According to various embodiments of the present disclosure, the first to third APP data may be generated according to operation of first to third APPs. The first to third APPs may be in an activation status and a specific APP may be in an execution status.

At operation 1205, the APP output devices 200 and 201 may classify the first to third APP data received from the APP operating device 100. According to various embodiments of the present disclosure, the APP output devices 200 and 201 may classify the first to third APP data for each of the APPs.

At operation 1207, the APP output devices 200 and 201 may generate first to third APP areas corresponding to the first to third APP data and may display the first to third APP areas on a side of a device display unit 240. According to various embodiments of the present disclosure, the APP output devices 200 and 201 may simultaneously display the first to third APP areas.

Further, at operation 1209, the APP output devices 200 and 201 may additionally output a basic area as well as the first to third APP areas on the device display unit 240. The first to third APP areas displayed on the APP output devices 200 and 201 may be automatically output without reception of a separate input signal.

Figure 13:
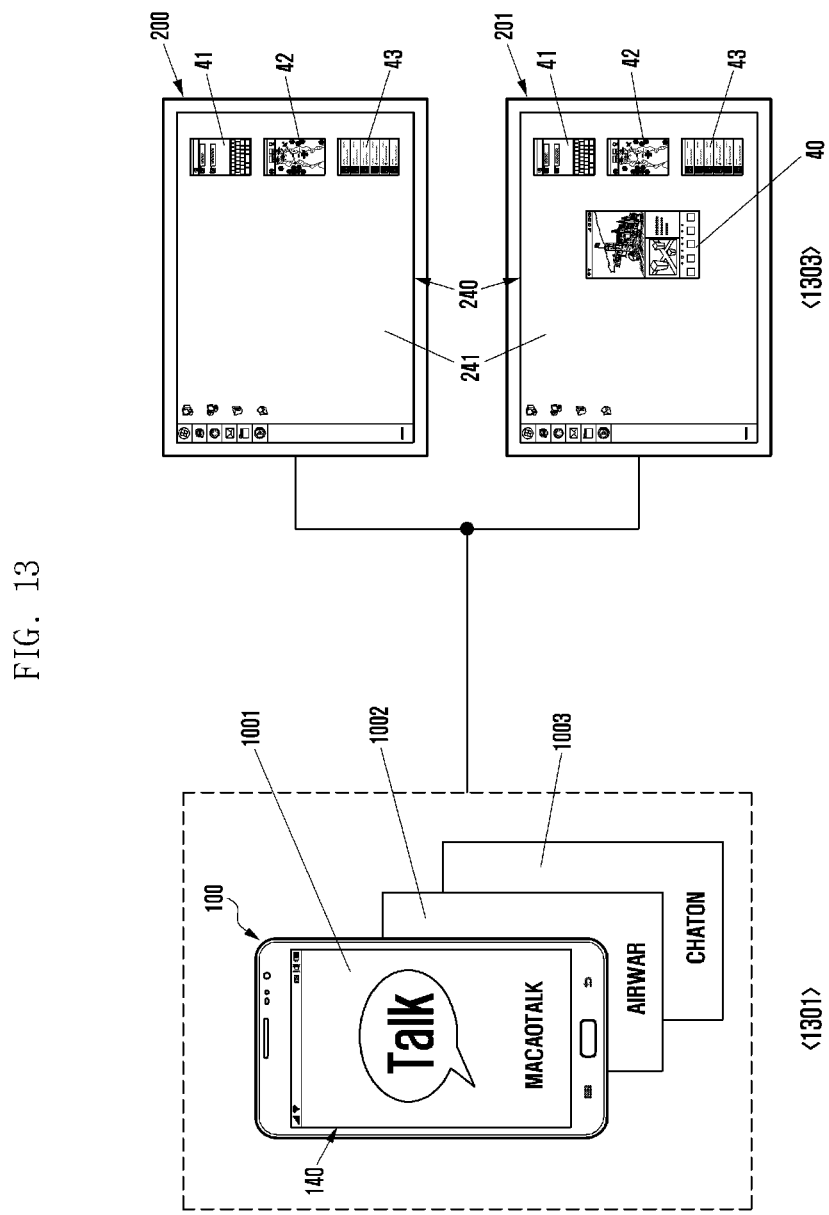
FIG. 13 illustrates an example of a screen interface for automatically displaying a plurality of APP areas among APP operation methods according to an embodiment of the present disclosure.

FIG. 13 illustrates an example of a screen interface for automatically displaying a plurality of APP areas among APP operation methods according to an embodiment of the present disclosure.

Referring to FIG. 13, it is assumed that, for example, three APPs 1001, 1002 and 1003 are in an activation status in an APP operating device 100 as a status 1301 of FIG. 13. The APP operating device 100 may output a running APP, for example, the first APP 1001 on the top layer while driving the three APPs 1001, 1002 and 1003. If APP output devices 200 and 201 are connected to the APP operating device 100, then the APP operating device 100 may transfer first to third APP data in an activation status to the APP output devices 200 and 201. A status 1303 of FIG. 13 may be a status in which the first and second APP output devices 200 and 201 are connected to the APP operating device 100. Alternatively, the status 1303 of FIG. 13 may be a status in which the first to third APP data of the APP operating device 100 may be output as in the first APP output device 200 or as in the second APP output device 201.

If the first and second APP output devices 200 and 201 are simultaneously connected to the APP operating device 100, then first to third APP areas 41, 42 and 43 may be simultaneously output on a side of a basic screen 241 of a device display unit 240 as in the first APP output device 200 according to characteristics of the APP output devices 200 and 201. Further, first to third APP areas 41, 42 and 43 and a basic area 40 may be simultaneously output on a side of a basic screen 241 as in the second APP output device 201. According to various embodiments of the present disclosure, the basic area 40 may be removed from the basic screen 241 or may be called again. If the first to third APP areas 41, 42 and 43 are automatically output, then the basic area 40 may be first output and then the first to third APP areas 41, 42 and 43 may be sequentially and automatically output in a predetermined area of the basic screen 241 as an image effect.

The APP operating device 100 may include, according to a usercontrol, list information on APPs to be automatically executed when the APP output devices 200 and 201 are connected thereto. If the APP output devices 200 and 201 are connected to the APP operating device 100, then the APP operating device 100 may automatically activate a specific APP and may automatically transfer APP data related to the activated specific APP to the APP output devices 200 and 201. According to various embodiments of the present disclosure, a size and a location of APP areas implemented by the APP data of the activated APP may be previously defined. For example, the APP operating device 100 may store and manage, according to a usercontrol, information for requesting that the APP data according to the operation of the specific APP be output at a center, a corner, or an edge of a display area of the APP output devices 200 and 201. If the APP output devices 200 and 201 are connected, then the APP operating device 100 may request that the APP areas be output in the display area of the corresponding APP output devices 200 and 201 while having a size and a location which are designated by a user request. Meanwhile, as described above, the APP output devices 200 and 201 may determine an output form of the APP areas by determining a previous output history of the APP areas. According to various embodiments of the present disclosure, the APP output devices 200 and 201 may output an APP area based on a specific APP data and then may store and manage information on a size and a location of the corresponding APP area. More particularly, the APP output devices 200 and 201 may store and manage, as an output history, information on a size and a location of an APP area shortly before a disconnection or when a connection is initiated.

If the APP output devices 200 and 201 are connected, then the APP operating device 100 may determine the connected APP output devices 200 and 201 and may activate APPs set to be automatically activated according to identification information of the APP output devices 200 and 201. The APP operating device 100 may determine, based on the identification information, to which APP output device APP data is provided.

Further, at least one of the APP operating device 100 and the APP output devices 200 and 201 may adjust, according to a user request, a location and a size of an APP area to be implemented by a specific APP data. In a case in which the APP operating device 100 receives the user request, the APP operating device 100 may transfer corresponding information to the APP output devices 200 and 201 and may update a location and a size of an APP area. In a case in which the APP output devices 200 and 201 receive the user request, the APP output device 200 and 201 may change location and size information of an APP area and may provide the changed information related to the APP area to the APP operating device 100 to share the changed information with the APP operating device 100.

Figure 14:
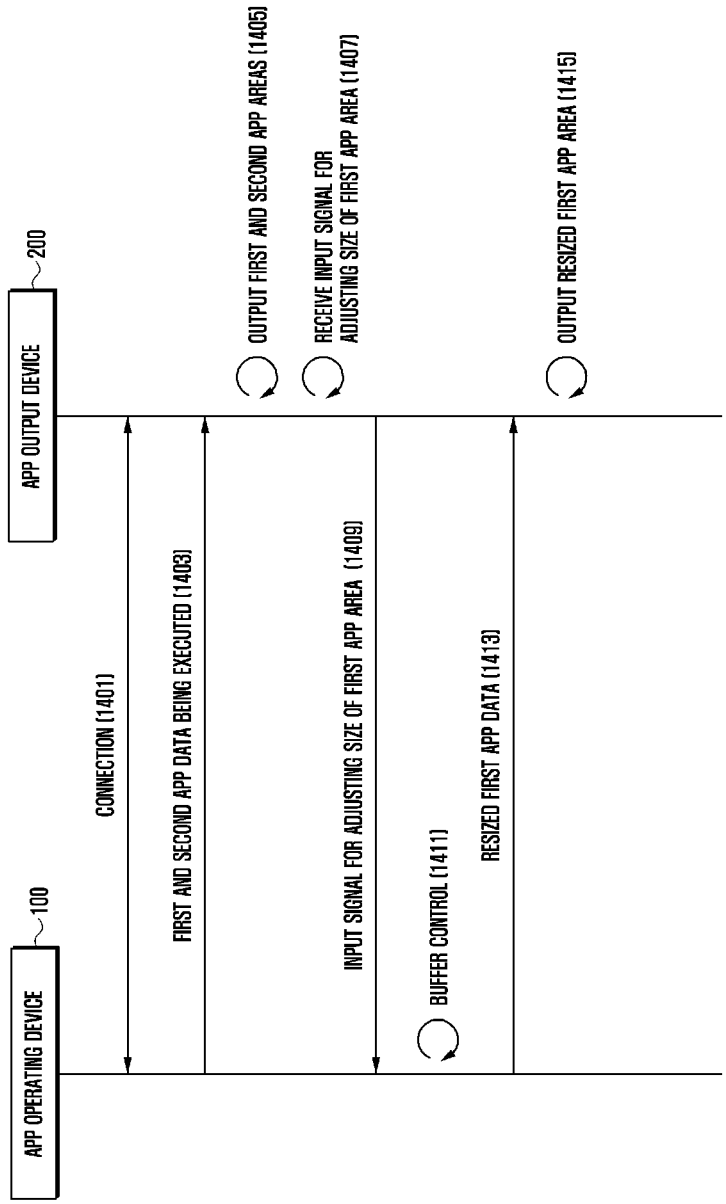
FIG. 14 is a signal flow diagram illustrating a method of adjusting an APP area among APP operation methods according to an embodiment of the present disclosure.

FIG. 14 is a signal flow diagram illustrating a method of adjusting an APP area among APP operation methods according to an embodiment of the present disclosure.

Referring to FIG. 14, at operation 1401, an APP operating device 100 and an APP output device 200 may be in a data transmission/reception status by performing a connection process.

At operation 1403, the APP operating device 100 may transmit first and second APP data to the APP output device 200 in operation 1403. According to various embodiments of the present disclosure, the first and second APP data may be APP data of at least some of APPs in an activation status in the APP operating device 100. The first and second APP data may include APP data of an APP in an execution status. Alternatively, the first and second APP data may include only APP data of an APP in an activation status other than the APP data of the APP in the execution status.

At operation 1405, the APP output device 200 may output first and second APP areas corresponding to the first and second APP data on a device display unit 240.

At operation 1407, the APP output device 200 may receive an input signal for adjusting a size of the first APP area.

At operation 1409, the APP output device 200 may transmit the signal for adjusting the size of the first APP area to the APP operating device 100.

If the APP operating device 100 receives the input signal for adjusting the size of the first APP area, the APP operating device 100 may execute a buffer operating unit 165 for the first APP. For example, when a request for expanding the size of the first APP area is received, the APP operating device 100 may perform buffer allocation corresponding to the input signal. The APP operating device 100 may record the resized first APP data in the allocated buffer.

At operation 1413, a controller 160 of the APP operating device 100 may provide the resized first APP data recorded in the corresponding buffer to the APP output device 200.

At operation 1415, the APP output device 200 may output a resized first APP area corresponding to the resized first APP data on the device display unit 240. According to various embodiments of the present disclosure, the APP output device 200 may output the first APP area decreased or increased in size according to the input signal for adjusting the size.

Figure 15:
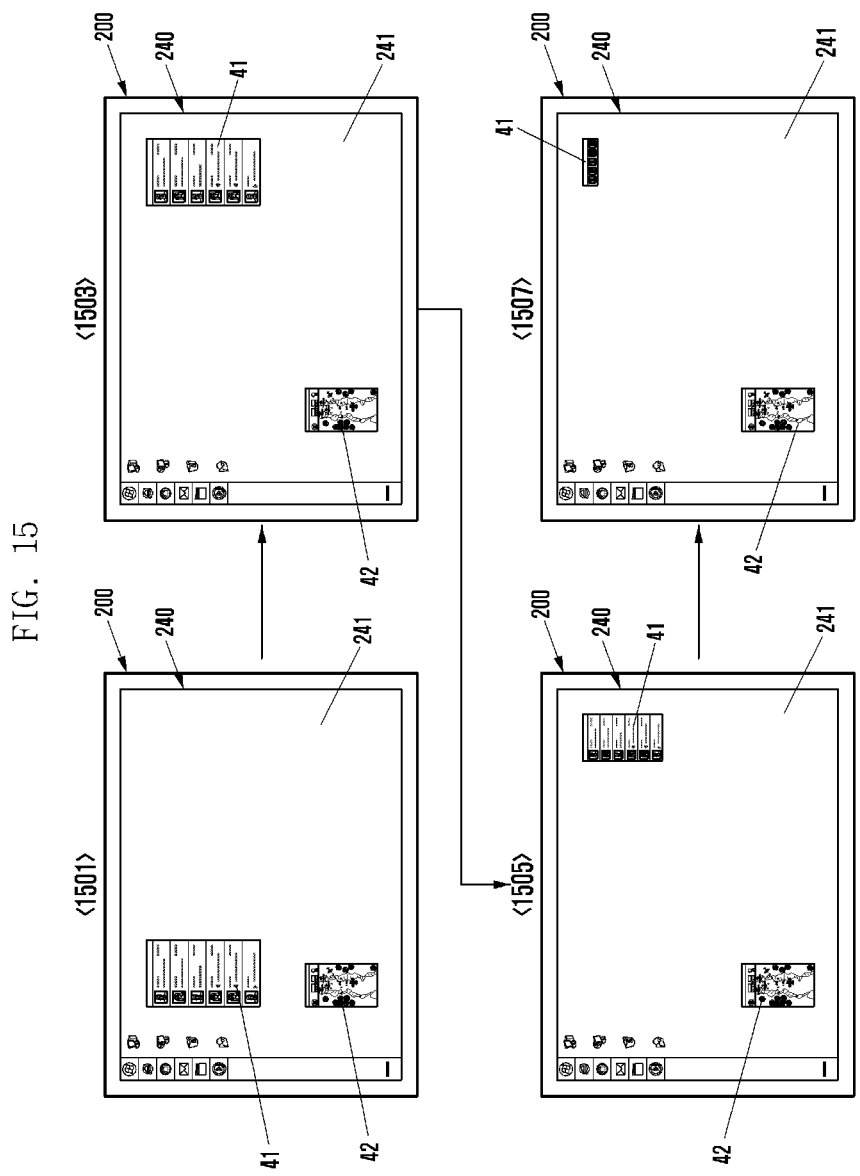
FIG. 15 illustrates an example of a screen interface for adjusting an APP area according to an embodiment of the present disclosure.

FIG. 15 illustrates an example of a screen interface for adjusting an APP area according to an embodiment of the present disclosure.

Referring to FIG. 15, after being connected with an APP operating device 100, an APP output device 200 may output first and second APP areas 41 and 42 corresponding to first and second APP data provided by the APP operating device 100 on a basic screen 241 of a device display unit 240 as illustrated on a screen 1501.

If the APP output device 200 receives an input signal for moving the first APP area 41, then the APP output device 200 may output the first APP area 41 of which the location is adjusted according to the input signal as illustrated on a screen 1503. The APP output device 200 may store and manage the location of the first APP area 41, and when an output of the first APP area 41 is requested, the APP output device 200 may output the first APP area 41 at the location at which the first APP area 41 had been just previously output on the device display unit 240.

If the APP output device 200 receives an input signal for adjusting a size of the first APP area 41, then the APP output device 200 may provide the input signal to the APP operating device 100 and may output the first APP area 41 of which the size is adjusted according to the input signal as illustrated on screens 1505 and 1507. The screen 1505 illustrates the first APP area 41 having a smaller size than that illustrated on the screen 1501 or 1503. The screen 1507 illustrates the first APP area 41 having the smallest size. A user may designate a corner of the first APP area 41 on the screen 1501 and perform a drag operation for an area adjustment by using a mouse of the APP output device 200. Further, the user may perform a selection of a virtual button key for requesting the smallest output. Alternatively, the user may perform a selection of a double tap for the first APP area 41.

The APP output device 200 may adjust the size of the first APP area 41 according to the above-described various input signals. According to various embodiments of the present disclosure, display methods for the first APP area 41 on the screen 1501 and the first APP area 41 on the screen 1507 may be switched with each other through a toggle method according to a design method. For example, when the first APP area 41 on the screen 1501 is tapped several times, the first APP area 41 on the screen 1501 may be changed to the first APP area 41 as illustrated on the screen 1507, and when the first APP area 41 on the screen 1507 is tapped several times, the first APP area 41 on the screen 1507 may be changed to the first APP area 41 as illustrated on the screen 1501.

Figure 16:
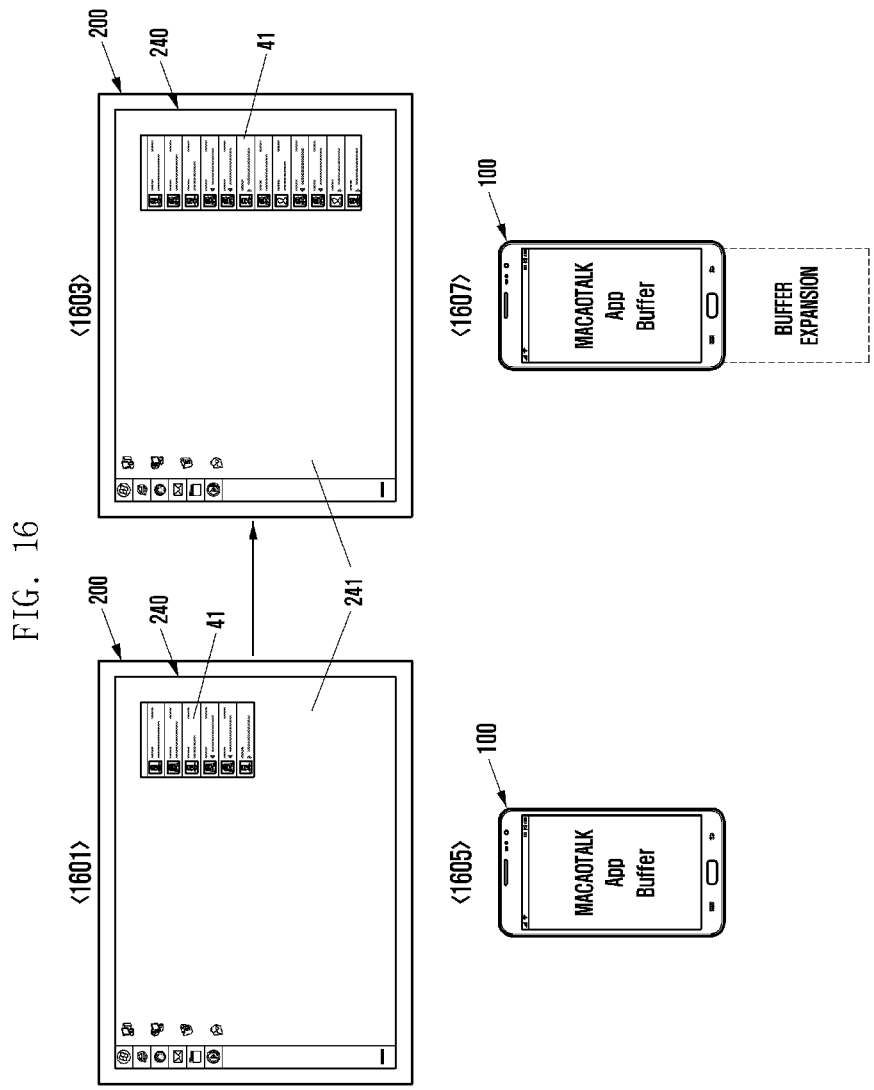
FIG. 16 illustrates an example of a screen interface for adjusting an APP area according to an embodiment of the present disclosure.

FIG. 16 illustrates an example of a screen interface for adjusting an APP area according to an embodiment of the present disclosure.

Referring to FIG. 16, a device display unit 240 of an APP output device 200 may output a first APP area 41 on a side of a basic screen 241 as illustrated on a screen 1601. According to various embodiments of the present disclosure, the APP output device 200 may perform a process for a connection with an APP operating device 100. The APP operating device 100 may activate a first APP and may provide first APP data according to the operation of the first APP to the APP output device 200. According to various embodiments of the present disclosure, during the process of activating the first APP and providing first APP data according to the operation of the first APP to the APP output device 200, the APP operating device 100 may allocate a buffer for the operation of the first APP at a predetermined size as a status 1605. Namely, the APP operating device 100 may allocate the buffer corresponding to a size of the first APP area 41 on the screen 1601 of the APP output device 200.

According to various embodiments of the present disclosure, the APP output device 200 may receive an input signal for expanding the first APP area 41. Then, the APP output device 200 may transmit the input signal for expanding the first APP area 41 to the APP operating device 100. The APP output device 200 may receive first APP data expanded in response to the request for expanding the first APP area 41 and may output the expanded first APP area 41 as illustrated on a screen 1603. According to various embodiments of the present disclosure, although the expanded first APP area 41 may be increased in size, the expanded first APP area 41 may also be provided in a form including more items as illustrated on the screen 1603.

The APP operating device 100 may allocate a buffer corresponding to the expanded first APP area 41 in response to the request for expanding the first APP area 41 as a status 1607. More data related to the first APP may be recorded in the expanded buffer. A controller 160 of the APP operating device 100 may transmit the expanded first APP data recorded in the expanded buffer to the APP output device 200.

Figure 17:
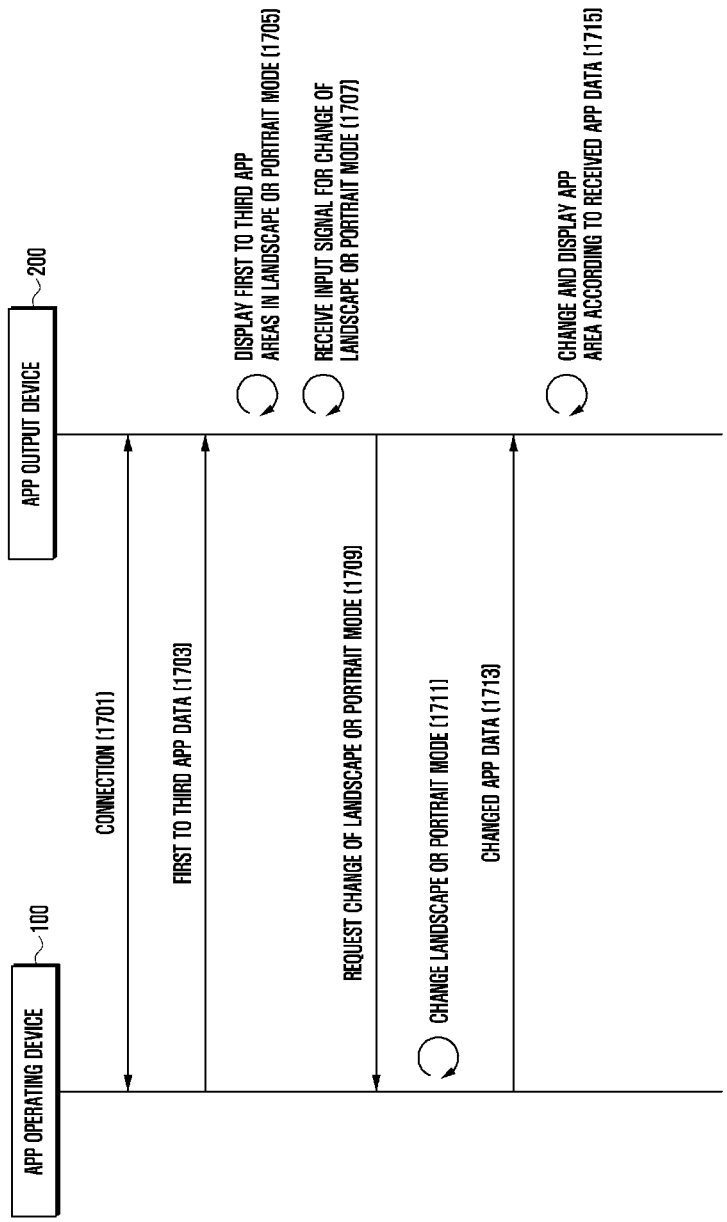
FIG. 17 is a signal flow diagram illustrating a method of processing a display direction of an APP area according to an embodiment of the present disclosure.

FIG. 17 is a signal flow diagram illustrating a method of processing a display direction of an APP area according to an embodiment of the present disclosure.

Referring to FIG. 17, at operation 1701, an APP operating device 100 and an APP output device 200 may perform a connection process. As described above, the connection process may be a process of forming at least one of a wired communication channel and a wireless communication channel through which data transmission and reception may be performed between the APP operating device 100 and the APP output device 200.

If the connection process is completed, then, at operation 1703, the APP operating device 100 may transmit first to third APP data to the APP output device 200. According to various embodiments of the present disclosure, first to third APPs corresponding to the first to third APP data may be in an activation status in the APP operating device 100. The APP operating device 100 may transmit information on a display direction of the APPs while transmitting the first to third APP data to the APP output device 200.

The APP output device 200 may output first to third APP areas corresponding to the first to third APP data received from the APP operating device 100 to a device display unit 240.

At operation 1705, the APP output device 200 may display the respective APPs in a landscape mode or a portrait mode. According to various embodiments of the present disclosure, the APP output device 200 may determine the information on the display direction of the APP data in a process of determining the first to third APP data.

At operation 1707, the APP output device 200 may receive an input signal for requesting a change of a landscape mode or a portrait mode for a specific APP area.

At operation 1709, the APP output device 200 may transmit the request for the change of the landscape or portrait mode to the APP operating device 100.

At operation 1711, the APP operating device 100 may change the landscape mode or portrait mode of the corresponding APP in response to the received request for the change of the landscape or portrait mode.

At operation 1713, the APP operating device 100 may transmit the APP data of which the display direction is changed to the APP output device 200.

At operation 1715, the APP output device 200 may output the APP area by changing the display direction of the APP area according to the received APP data.

Figure 18:
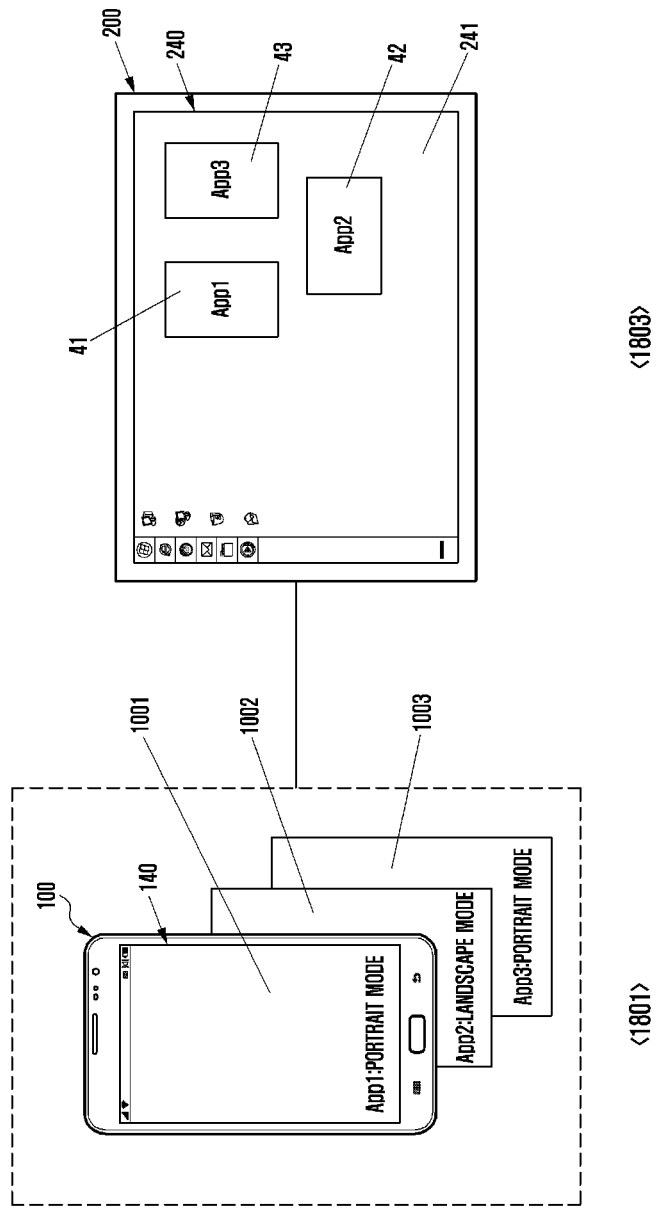
FIG. 18 illustrates an example of processing a display direction of an APP area according to an embodiment of the present disclosure.

FIG. 18 illustrates an example of processing a display direction of an APP area according to an embodiment of the present disclosure.

Referring to FIG. 18, it is assumed that first to third APPs 1001, 1002 and 1003 are in an activation status in an APP operating device 100 as a status 1801. The APP operating device 100 may output the first APP 1001 in an execution status among the first to third APPs 1001, 1002 and 1003 on the top layer. According to various embodiments of the present disclosure, the first APP 1001 may be displayed in a portrait mode on a display unit 40 according to setting information of the corresponding APP or a user's request. Meanwhile, the second and third APPs 1002 and 1003 may be in the activation status and may be operated through background processing. According to various embodiments of the present disclosure, the second APP 1002 may be arranged in a landscape mode and the third APP 1003 may be arranged in a portrait mode. APP data for the second and third APPs 1002 and 1003 may be recorded in a memory according to the display mode of the APPs. Consequently, the APP operating device 100 may provide information on the display mode of the first to third APPs 1001, 1002 and 1003 to the APP output device 200.

Meanwhile, the APP output device 200 may be connected with the APP operating device 100 and may receive first to third APP data for the first to third APPs 1001, 1002 and 1003 from the APP operating device 100. Then, the APP output device 200 may output first to third APP areas 41, 42 and 43 for the first to third APP data as illustrated on a screen 1803. According to various embodiments of the present disclosure, the APP output device 200 may output the APP areas in a predetermined display direction on a device display unit 240 according to the mode in which the APPs have been displayed in the APP operating device 100 or the display mode set in the APP operating device 100. Namely, the APP output device 200 may output the first APP area 41 in the portrait mode, in which the first APP 1001 has been displayed in the APP operating device 100, on a basic screen 241 of the device display unit 240. Further, the APP output device 200 may output the second APP area 42 in the landscape mode, in which the second APP 1002 has been displayed in the APP operating device 100, on the basic screen 241 of the device display unit 240. In addition, the APP output device 200 may output the third APP area 43 in the portrait mode, in which the third APP 1003 has been displayed in the APP operating device 100, on the basic screen 241 of the device display unit 240.

Figure 19:
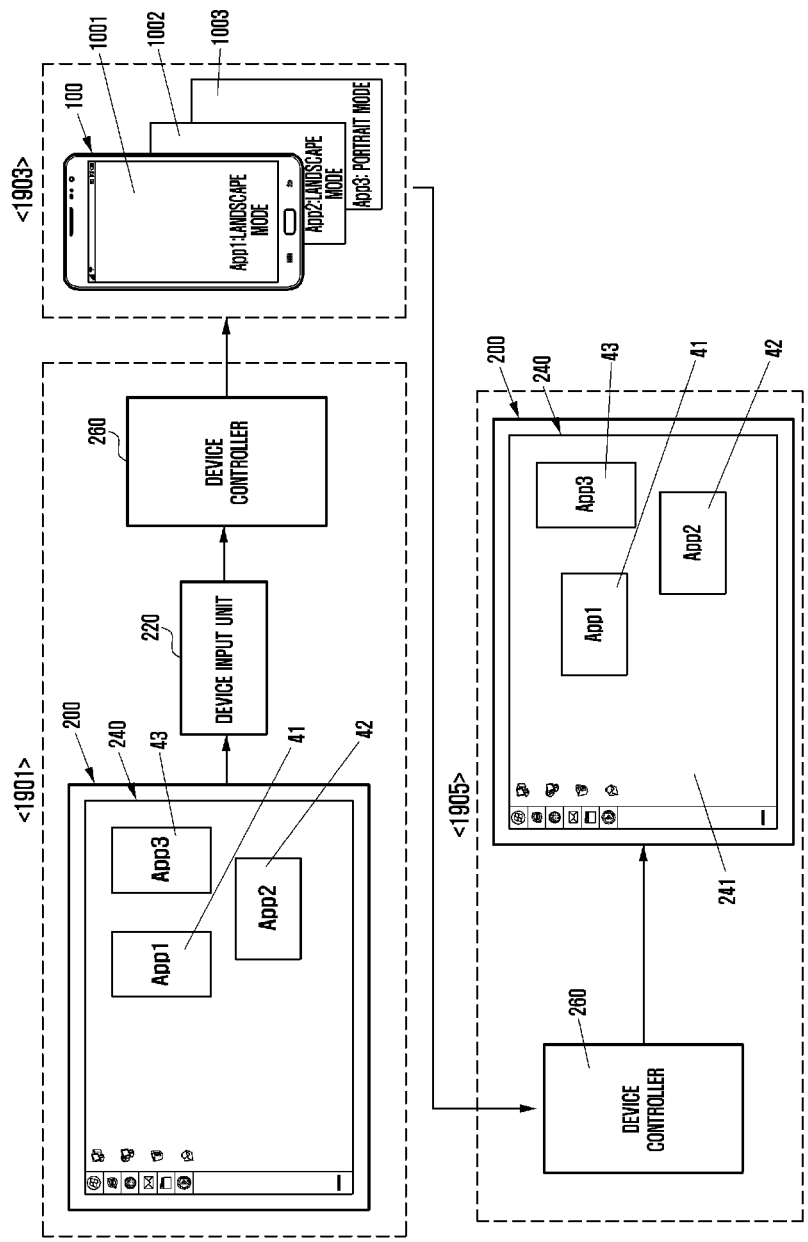
FIG. 19 illustrates an example of changing a display direction of an APP area according to an embodiment of the present disclosure.

FIG. 19 illustrates an example of changing a display direction of an APP area according to an embodiment of the present disclosure.

Referring to FIG. 19, an APP output device 200 is connected with an APP operating device 100 and may output a plurality of APPs in an activation status in the APP operating device 100 to a basic screen 241 of a device display unit 240 as a status 1901 according to activation of an external output mode of the present disclosure. According to various embodiments of the present disclosure, first and third APP areas 41 and 43 may be output in a portrait mode and a second APP area 42 may be output in a landscape mode according to a display mode of first to third APP data provided by the APP operating device 100. In this status, the APP output device 200 may receive an input signal for requesting a change of a display direction of a first APP 1001 from a device input unit 220. Then, the device input unit 220 transfers the signal for requesting the change of the display direction to a device controller 260, and the device controller 260 transfers the signal to the APP operating device 100 through a device connector 270.

If the APP operating device 100 receives, from the APP output device 200, the input signal for requesting the change of the display direction for the first APP, for example, a change from a portrait mode to a landscape mode, the APP operating device 100 may change the display direction of the first APP 1001 as a status 1903. Namely, the APP operating device 100 may change the display direction of the first APP 1001 from the portrait mode to the landscape mode. The APP operating device 100 transfers, to the APP output device 200, first APP data of the first APP 1001 of which the display direction has been changed.

When receiving the first APP data of the first APP 1001 of which the display direction has been changed from the APP operating device 100, the device controller 260 of the APP output device 200 may control such that the first APP area 41 is changed from the portrait mode to the landscape mode and the changed first APP area 41 is displayed as a status 1905.

Figure 20:
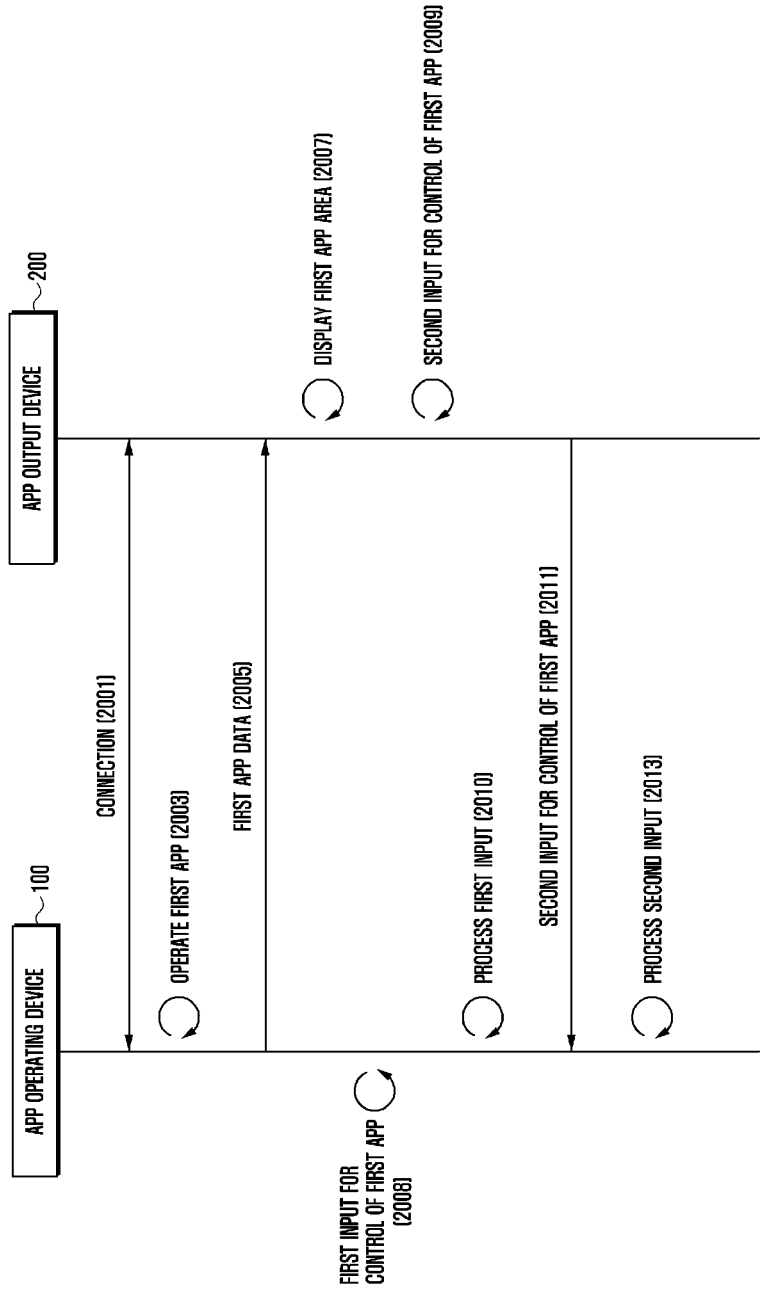
FIG. 20 is a signal flow diagram illustrating a method of simultaneously operating an APP according to an embodiment of the present disclosure.

FIG. 20 is a signal flow diagram illustrating a method of simultaneously operating an APP according to an embodiment of the present disclosure.

Referring to FIG. 20, at operation 2001, an APP operating device 100 and an APP output device 200 may perform a connection process.

At operation 2003, the APP operating device 100 may operate a first APP according to an input signal that is input from an input unit 120 or a device input unit 220 of the APP output device 200. Alternatively, the APP operating device 100 may automatically activate the first APP when the APP output device 200 is connected. According to various embodiments of the present disclosure, the APP operating device 100 may previously store information on a list of APPs to be automatically executed if the APP output device 200 is connected. Such information may be defined by a user. Further, the APP list may be differently defined according to a type of the APP output device 200.

At operation 2005, if first APP data is generated according to the operation of the first APP, then the APP operating device 100 may transmit the first APP data to the APP output device 200.

At operation 2007, the APP output device 200 may display a first APP area corresponding to the first APP data on a device display unit.

At operation 2008, the APP operating device 100 may receive a first input for control of the first APP independently of the APP output device 200.

At operation 2010, the APP operating device 100 may process the first input in operation 2010. For example, the APP operating device 100 may receive a touch event for the control of the first APP and may accordingly control such that the corresponding touch event is applied to the first APP. According to various embodiments of the present disclosure, when the first APP data is updated according to the processing of the first input, the APP operating device 100 may share the first APP data with the APP output device 200.

At operation 2009, the APP output device 200 may receive a second input for the control of the first APP.

If the APP output device 200 receives the second input for the control of the first APP at operation 2009, then at operation 2011, the APP output device 200 may transmit the second input for the control of the first APP to the APP operating device 100.

At operation 2013, the APP operating device 100 may apply the received second input to the first APP. For example, the App operating device 100 may process the second input. The APP operating device 100 may transmit the updated first APP data of the first APP to which the second input has been applied to the APP output device 200.

The situation illustrated in FIG. 20 will be described more specifically with reference to FIG. 21.

Figure 21:
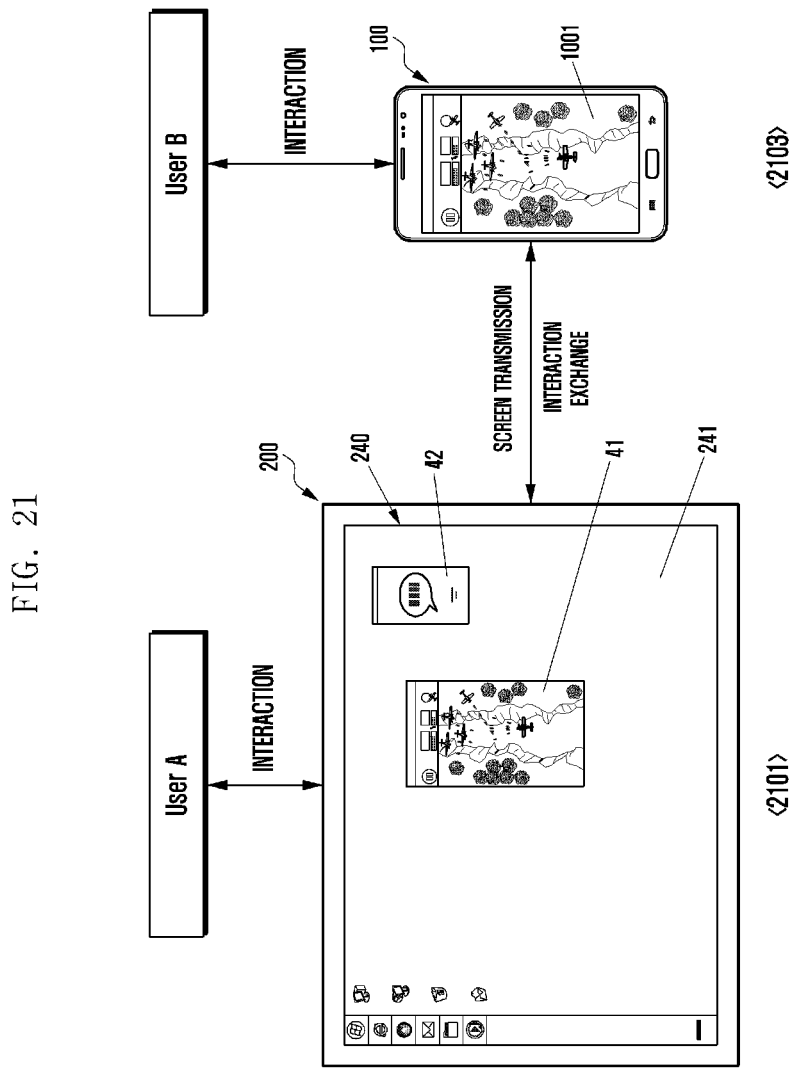
FIG. 21 illustrates device control for simultaneously operating an APP according to an embodiment of the present disclosure.

FIG. 21 illustrates device control for simultaneously operating an APP according to an embodiment of the present disclosure.

Referring to FIG. 21, two users A and B may perform operation for executing an identical APP, for example, a first APP 1001 by using an APP output device 200 and an APP operating device 100, respectively. According to various embodiments of the present disclosure, the APP operating device 100 and the APP output device 200 may be in a connection status in which a communication channel is formed therebetween. Then, the APP output device 200 may output a first APP area 41 on a basic screen 241 of a device display unit 240 as a status 2101. In addition, the APP output device 200 may also output a second APP area 42 corresponding to second APP data provided by the APP operating device 100 on a side of the basic screen 241.

According to various embodiments of the present disclosure, the APP operating device 100 may output an execution screen of the first APP 1001 to a display unit 140 in response to a request for execution of the first APP 1001 as a status 2103. Then, the APP operating device 100 may transmit the first APP data corresponding to the first APP 1001 to the APP output device 200. In addition, the APP operating device 100 may transmit, to the APP output device 200, the second APP data for the second APP maintained in background processing.

In the above-described status, the user B may generate a first input for control of the first APP by using an input unit 120 or the display unit 140 having an input function, which is included in the APP operating device 100. Meanwhile, the user A may generate a second input for the control of the first APP by controlling a device input unit 220 or a device display unit 240 having an input function, which is included in the APP output device 200. The APP output device 200 may transmit the second input to the APP operating device 100. Consequently, the APP operating device 100 may apply the first input generated from the input unit 120 and the second input provided by the APP output device 200 to the first APP 1001. The APP operating device 100 may share the updated first APP data of the first APP 1001, to which the first and second inputs have been applied, with the APP output device 200.

Figure 22:
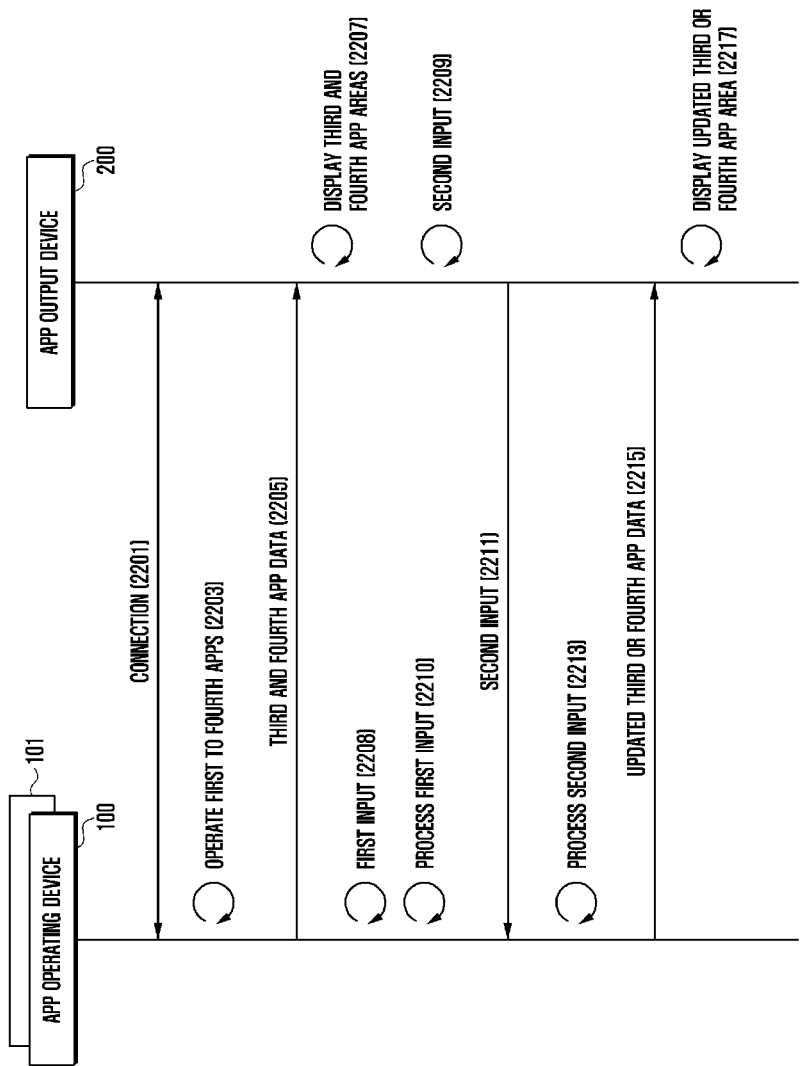
FIG. 22 is a signal flow diagram illustrating a method of separately operating an APP according to an embodiment of the present disclosure.

FIG. 22 is a signal flow diagram illustrating a method of separately operating an APP according to an embodiment of the present disclosure.

Referring to FIG. 22, at operation 2201, APP operating devices 100 and 101 and an APP output device 200 may be in a connection status. The APP output device 200 may include a device connector 270, which may be connected with the plurality of APP operating devices 100 and 101, for the connection between the APP operating devices 100 and 101 and the APP output device 200. For example, the device connector 270 may have a plurality of USB connection ports. Further, the device connector 270 may include a plurality of communication modules.

At operation 2203, among the APP operating devices 100 and 101, the first APP operating device 100 may operate a first APP and the second APP operating device 101 may operate a second APP, in operation 2203. In addition, the first APP operating device 100 may maintain a third APP in background processing and the second APP operating device 101 may maintain a fourth APP in background processing.

At operation 2205, the first APP operating device 100 may transmit third APP data to the APP output device 200 and the second APP operating device 101 may transmit fourth APP data to the APP output device 200.

At operation 2207, the APP output device 200 may output a third APP area corresponding to the third APP data and a fourth APP area corresponding to the fourth APP data.

Meanwhile, the APP operating devices 100 and 101 may operate the first and second APPs according to an input signal from input units provided to the corresponding device independently of the APP output device 200. At operation 2208, the APP operating devices 100 and 101 may receive a first input. If the APP operating devices 100 and 101 receive a first input at operation 2208, then at operation 2210, the APP operating devices 100 and 101 may apply the first input to the first and second APPs. According to various embodiments of the present disclosure, the APP operating devices 100 and 101 may not provide APP data of the first and second APPs to the APP output device 200.

At operation 2209, the APP output device 200 may receive a second input generated from a device input unit 220.

At operation 2211, the APP output device 200 may transmit the second input to the APP operating devices 100 and 101. According to various embodiments of the present disclosure, the APP output device 200 may transmit the second input for the third APP to the first APP operating device 100 and the second input for the fourth APP to the second APP operating device 101.

At operation 2213, the APP operating devices 100 and 101 may process the second input. Namely, the APP operating devices 100 and 101 may apply the second input to any one of the third and fourth APPs indicated by the second input.

At operation 2215, the APP operating devices 100 and 101 may transmit the updated third or fourth APP data to the APP output device 200.

At operation 2217, the APP output device 200 may control an update of the third or fourth APP area corresponding to the updated third or fourth APP data.

Figure 23:
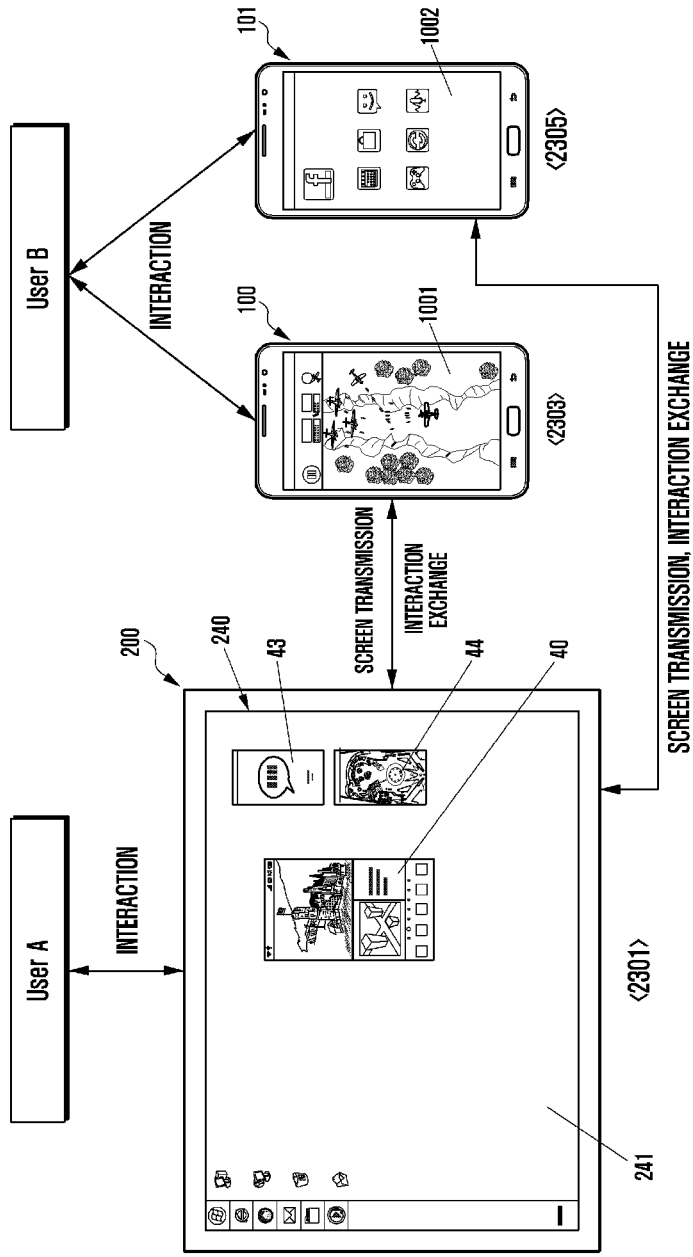
FIG. 23 illustrates device control for separately operating an APP according to an embodiment of the present disclosure.

FIG. 23 illustrates device control for separately operating an APP according to an embodiment of the present disclosure.

Referring to FIG. 23, an APP output device 200 may display a basic area 40, a third APP area 43 and a fourth APP area 44 on a basic screen 241 of a device display unit 240 as a status 2301. According to various embodiments of the present disclosure, the APP output device 200 may receive third and fourth APP data from at least one of first and second APP operating devices 100 and 101. Hereinafter, it is assumed that a third APP is an APP processed in background processing of the first APP operating device 100 and a fourth APP is an APP processed in background processing of the second APP operating device 101. According to various embodiments of the present disclosure, the basic area 40 may be received from any one of the first and second APP operating devices 100 and 101. The APP output device 200 may provide a menu capable of calling basic areas of the APP operating devices 100 and 101 connected through a device connector.

According to various embodiments of the present disclosure, the first APP operating device 100 may execute a first APP 1001 and output an appropriate screen to a display unit as a status 2303. The first APP operating device 100 may apply an input signal generated in the corresponding device to the first APP 1001. The first APP operating device 100 may support maintenance of the third APP in the background processing and may transmit the third APP data corresponding to the third APP to the APP output device 200. If the first APP operating device 100 receives an input signal related to the third APP from the APP output device 200, then the first APP operating device 100 may apply the corresponding input signal to the third APP and transmit the updated third APP data to the APP output device 200.

The second APP operating device 101 may execute a second APP 1002 and output an appropriate screen to a display unit as a status 2305. The second APP operating device 101 may apply an input signal generated in the corresponding device to the second APP 1002. The second APP operating device 101 may support maintenance of the fourth APP in the background processing and may transmit the fourth APP data corresponding to the fourth APP to the APP output device 200. If the second APP operating device 101 receives an input signal related to the fourth APP from the APP output device 200, then the second APP operating device 101 may apply the corresponding input signal to the fourth APP and transmit the updated fourth APP data to the APP output device 200.

Although, in the above description, the display unit 140 of the APP operating device 100 is maintained in a turned-on status even if the APP output device 200 is connected to the APP operating device 100, various embodiments of the present disclosure are not limited thereto. According to various embodiments of the present disclosure, the APP operating device 100 may automatically turn off the display unit 140 when outputting the APP data to the APP output device 200 after the connection with the APP output device 200. Further, the APP operating device 100 may also turn on the display unit 140 when a separate input signal is generated and turn on or off the display unit 140 according to application of a sleep mode.

As described above, the APP operation function according to various embodiments of the present disclosure may support the output of at least one APP data being operated in the APP operating device 100 through the APP output device 200, and the manipulation of the corresponding APP according to the input signal generated in the APP output device 200. More particularly, according to various embodiments of the present disclosure, the APP operation function supports easy processing of management and operation for various APPs being operated in the APP operating device 100, by outputting the APPs maintained in the background processing in the APP operating device 100 to the APP output device 200. In addition, the APP operation function may support more active APP operation, by freely manipulating the display direction, the size and the location of the APPs. Further, the APP operation function supports independent or cooperative performance of various APP functions by various users.

Meanwhile, at least one of the APP operating device 100 and the APP output device 200 described above may further include various additional modules according to the provided form. Namely, when being used as a communication terminal, at least one of the APP operating device 100 and the APP output device 200 may also further include unmentioned configurations such as a NFC module for near field communication, an internet communication module for performing an internet function by communicating with an internet network, a digital broadcasting module for performing functions of receiving and reproducing digital broadcasting and the like. Although all such elements may not be enumerated because modifications thereof can be diversely made according to a convergence trend of digital devices, elements equivalent to the aforementioned elements may be further included in the devices. Further, according to various embodiments of the present disclosure, specific configurations in at least one of the APP operating device 100 and the APP output device 200 may also be omitted or replaced by other configurations according to the provided form thereof. This will be easily understood by those skilled in the art to which various embodiments of the present disclosure pertain.

According to various embodiments of the present disclosure, at least one of the APP operating device 100 and the APP output device 200 may be an electronic device.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure have been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an Application (APP), the method comprising:
    connecting an APP operating device and an APP output device;
    transmitting, by the APP operating device, APP data corresponding to a plurality of APPs being executed in the APP operating device to the APP output device; and
    outputting, by the APP output device, a plurality of APP areas respectively corresponding to the APP data,
    wherein the plurality of APPS displayed on the APP output device is in a respective execution status in the plurality of APP areas.

2. The method of claim 1, further comprising:
    displaying a basic area corresponding to at least one of a standby screen or a menu screen of the APP operating device.

3. The method of claim 2, further comprising:
    executing, by the APP operating device, an APP selected in the basic area; and outputting, by the APP output device, an APP area based on APP data according to the executing of the APP.

4. The method of claim 1, further comprising:
displaying an APP list comprising APP items that are to be operated in the APP operating device.

5. The method of claim 4, further comprising:
receiving, by the APP output device, an input signal for selecting a specific item of the APP list;
providing, by the APP output device, the received input signal to the APP operating device;
executing, by the APP operating device, an APP corresponding to the input signal;
providing, by the APP operating device, APP data of the corresponding APP to the APP output device; and
displaying, by the APP output device, an APP area corresponding to the provided APP data.

6. The method of claim 1, further comprising:
outputting an execution screen of at least one of the plurality of APPs to a full screen of a display unit of the APP operating device.

7. The method of claim 1, further comprising:
receiving, by the APP output device, an input signal for requesting a change of a display direction of the APP areas;
changing, by the APP operating device, the display direction of at least one APP from a landscape mode to a portrait mode, or from the portrait mode to the landscape mode;
transmitting, by the APP operating device, changed APP data to the APP output device according to the input signal;
changing, by the APP output device, the display direction of the APP area according to the changed APP data; and
displaying, by the APP output device, the changed APP area.

8. The method of claim 1, further comprising:
receiving, by the APP output device, an input signal for adjusting a size of the plurality of APP areas; and
adjusting, by the APP output device, the size of the plurality of APP areas according to the input signal.

9. The method of claim 1, further comprising:
receiving, by the APP operating device, an input signal for operating any one of the plurality of APPs from at least one of an input device comprised in the APP operating device or an input device comprised in the APP output device;
applying, by the APP operating device, the input signal to the APP;
outputting, by the APP operating device, the updated APP data according to the applying of the input signal to a display unit of the APP operating device; and
providing, by the APP operating device, the updated APP data to the APP output device.

10. A device for operating an Application (APP), the device comprising:
a storage unit configured to store a plurality of APPs;
a controller configured to:
provide any one of the plurality of APPs in an execution status,
maintain remaining APPs in background processing; and
a connection interface configured to provide a communication channel for transmitting APP data corresponding to the plurality of APPs to an APP output device,
wherein the plurality of APPs displayed on a plurality of APP areas of the APP output device is in a respective execution status in the plurality of APP areas.

11. The device of claim 10, wherein the controller is further configured to, when an event for operating at least one of the plurality of APPs is generated, apply the corresponding event to the APP and to transmit APP data updated according to the applying of the event to the APP output device.

12. The device of claim 10, wherein the controller is further configured to, when receiving an input signal from the APP output device,
determine a type of the APP to which the corresponding input signal is to be applied, and
transmit APP data updated by applying the input signal to the corresponding APP to the APP output device.

13. The device of claim 10, wherein the controller is further configured to:
automatically activate a specific APP previously defined according to identification information of the APP output device, and
transmit the corresponding APP data to the APP output device, when the APP output device is connected.

14. The device of claim 10, wherein the controller is further configured to provide, to the APP output device, at least one of display direction, location or size information of APP areas that are to be output to the APP output device by the APP data.

15. A device for outputting an Application (APP), the device comprising:
a device connector configured to receive APP data corresponding to a plurality of APPs in an execution status in an APP operating device;
a device controller configured to generate a plurality of APP areas respectively corresponding to the APP data; and
a device display unit configured to display the plurality of APP areas,
wherein the plurality of APPs displayed on the APP output device is in a respective execution status in the plurality of APP areas.

16. The device of claim 15, wherein the device display unit is further configured to display the plurality of APP areas in one of a landscape mode and a portrait mode according to information on a display direction of the APP data.

17. The device of claim 15, wherein the device display unit is further configured to display at least one of an APP list comprising at least one APP item providing a request for activation of the APPs that are to be operated in the APP operating device, and a basic area.

18. The device of claim 15, further comprising:
a device input unit configured to generate an input signal for control of the APPs corresponding to the plurality of APP areas.

19. The device of claim 18, wherein the device controller is further configured to:
provide an input signal for at least one of changing a display direction of the plurality of APP areas,
adjusting a size of the APP areas or changing a location of the APP areas generated by the device input unit to the APP operating device,
change the display direction of the corresponding APP area by receiving the APP data of which the display direction has been changed, and
operatively display the corresponding APP area.

20. The device of claim 15, wherein the device controller is configured to:
determine a history of a previous output location when a specific APP area is output, and determine a location of the corresponding APP area on the device display unit according to the history.

* * * * *